(12) United States Patent
Abotabl et al.

(10) Patent No.: US 12,402,072 B2
(45) Date of Patent: Aug. 26, 2025

(54) BANDWIDTH-PART-SPECIFIC NETWORK OPERATION MODES

(71) Applicant: QUALCOMM Incorporated, San Diego, CA (US)

(72) Inventors: Ahmed Attia Abotabl, San Diego, CA (US); Hung Dinh Ly, San Diego, CA (US); Yu Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 630 days.

(21) Appl. No.: 17/877,759

(22) Filed: Jul. 29, 2022

(65) Prior Publication Data

US 2024/0040504 A1 Feb. 1, 2024

(51) Int. Cl.
*H04W 52/02* (2009.01)

(52) U.S. Cl.
CPC ... *H04W 52/0216* (2013.01); *H04W 52/0235* (2013.01); *H04W 52/0274* (2013.01)

(58) Field of Classification Search
CPC ......... H04W 52/0216; H04W 52/0235; H04W 52/0274; H04W 72/0453; H04W 52/0229
USPC .......... 370/311, 318; 455/13.4, 127.1, 127.5, 455/343.1–343.5, 522, 574
See application file for complete search history.

(56) References Cited

U.S. PATENT DOCUMENTS

| | | | |
|---|---|---|---|
| 2021/0360532 A1* | 11/2021 | Jiang | H04W 52/0229 |
| 2022/0030529 A1* | 1/2022 | Xu | H04W 52/58 |
| 2023/0199659 A1* | 6/2023 | Zhou | H04L 5/0078 370/318 |

* cited by examiner

*Primary Examiner* — Michael Y Mapa
(74) *Attorney, Agent, or Firm* — Kevin M. Donnelly; Holland & Hart LLP

(57) ABSTRACT

Methods, systems, and devices for wireless communication are described. A user equipment (UE) may receive first control signaling including an energy saving mode indication that identifies one or more energy saving modes of a network entity, one or more respective bandwidth parts (BWPs) associated with each of the one or more energy saving modes, and one or more respective durations over which each of the one or more energy saving modes is to be used at the network entity. The UE may receive second control signaling scheduling a data signal to be communicated between the UE and the network entity over a duration over which an energy saving mode is to be used at the network entity. The UE may communicate the data signal over the duration in accordance with the energy saving mode and using a BWP associated with the energy saving mode.

30 Claims, 17 Drawing Sheets

BANDWIDTH-PART-SPECIFIC NETWORK OPERATION MODES

TECHNICAL FIELD

The following relates to wireless communication, including bandwidth-part-specific (BWP-specific) network operation modes.

DESCRIPTION OF THE RELATED TECHNOLOGY

Wireless communication systems are widely deployed to provide various types of communication content such as voice, video, packet data, messaging, broadcast, and so on. These systems may be capable of supporting communication with multiple users by sharing the available system resources (for example, time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communication system may include one or more network entities, each supporting wireless communication for communication devices, which may be known as user equipment (UE).

In some wireless communication systems, a network entity may transition between multiple operation modes associated with different communication parameters, such as bandwidth, transmit power, and antenna ports, among other examples. For instance, the network entity may determine to operate in an energy saving mode, in which a bandwidth used for communication with a UE may be reduced, such that the network entity may reduce power consumption while maintaining network operations. In some cases, the network entity may operate in the energy saving mode for a fixed duration. The network entity may also determine to operate in a flexible mode in which the network entity may adapt an operation mode of the network entity, such as among one or more energy saving modes and one or more other operation modes, based on traffic conditions, among other examples. For instance, while operating in the flexible mode, the network entity may switch among one or more modes. For example, the network entity may operate in an energy saving mode in response to reduced traffic levels, such as while serving a reduced quantity of UEs, or one or more other operation modes (e.g. non-energy saving modes) in response to increased traffic levels, such as while serving an increased quantity of UEs. The network entity may communicate indications of operation mode changes of the network entity to UEs being served by the network entity. In some cases, however, communicating relatively-frequent operation mode changes to multiple UEs may be inefficient and lead to increased signaling overhead, among other disadvantages.

SUMMARY

The systems, methods and devices of this disclosure each have several innovative aspects, no single one of which is solely responsible for the desirable attributes disclosed herein.

One innovative aspect of the subject matter described in this disclosure can be implemented in a method for wireless communication at a user equipment (UE). The method includes receiving first control signaling including an energy saving mode indication that identifies: one or more energy saving modes of a network entity, one or more respective bandwidth parts (BWPs) associated with each of the one or more energy saving modes, and one or more respective durations over which each of the one or more energy saving modes is to be used at the network entity, receiving second control signaling scheduling a data signal to be communicated between the UE and the network entity over a duration of the one or more respective durations over which an energy saving mode of the one or more energy saving modes is to be used at the network entity, and communicating the data signal over the duration in accordance with the energy saving mode and using a BWP of the one or more respective BWPs associated with the energy saving mode.

Another innovative aspect of the subject matter described in this disclosure can be implemented in an apparatus for wireless communication at a UE. The apparatus includes a processor, memory coupled with the processor, and instructions stored in the memory. The instructions may be executable by the processor to cause the apparatus to receive first control signaling including an energy saving mode indication that identifies: one or more energy saving modes of a network entity, one or more respective BWPs associated with each of the one or more energy saving modes, and one or more respective durations over which each of the one or more energy saving modes is to be used at the network entity, receive second control signaling scheduling a data signal to be communicated between the UE and the network entity over a duration of the one or more respective durations over which an energy saving mode of the one or more energy saving modes is to be used at the network entity, and communicate the data signal over the duration in accordance with the energy saving mode and using a BWP of the one or more respective BWPs associated with the energy saving mode.

Another innovative aspect of the subject matter described in this disclosure can be implemented in an apparatus for wireless communication at a UE. The apparatus includes means for receiving first control signaling including an energy saving mode indication that identifies: one or more energy saving modes of a network entity, one or more respective BWPs associated with each of the one or more energy saving modes, and one or more respective durations over which each of the one or more energy saving modes is to be used at the network entity, means for receiving second control signaling scheduling a data signal to be communicated between the UE and the network entity over a duration of the one or more respective durations over which an energy saving mode of the one or more energy saving modes is to be used at the network entity, and means for communicating the data signal over the duration in accordance with the energy saving mode and using a BWP of the one or more respective BWPs associated with the energy saving mode.

Another innovative aspect of the subject matter described in this disclosure can be implemented in a non-transitory computer-readable medium storing code for wireless communication at a UE. The code includes instructions executable by a processor to receive first control signaling including an energy saving mode indication that identifies: one or more energy saving modes of a network entity, one or more respective BWPs associated with each of the one or more energy saving modes, and one or more respective durations over which each of the one or more energy saving modes is to be used at the network entity, receive second control signaling scheduling a data signal to be communicated between the UE and the network entity over a duration of the one or more respective durations over which an energy saving mode of the one or more energy saving modes is to be used at the network entity, and communicate the data signal over the duration in accordance with the energy saving mode and using a BWP of the one or more respective BWPs associated with the energy saving mode.

Some examples of the method, apparatuses, and non-transitory computer-readable medium described herein may further include operations, features, means, or instructions for receiving third control signaling scheduling a second data signal to be communicated between the UE and the network entity using a second BWP and communicating, in response to receiving the third control signaling, the second data signal using the second BWP in accordance with a default operation mode of the network entity based on the second BWP being unidentified in the energy saving mode indication.

Another innovative aspect of the subject matter described in this disclosure can be implemented in a method for wireless communication at a network entity. The method includes outputting first control signaling including an energy saving mode indication that identifies: one or more energy saving modes of the network entity, one or more respective BWPs associated with each of the one or more energy saving modes, and one or more respective durations over which each of the one or more energy saving modes is to be used at the network entity, outputting second control signaling scheduling a data signal to be communicated between a UE and the network entity over a duration of the one or more respective durations over which an energy saving mode of the one or more energy saving modes is to be used at the network entity, and communicating the data signal: over the duration, in accordance with the energy saving mode, and using a BWP of the one or more respective BWPs associated with the energy saving mode.

Another innovative aspect of the subject matter described in this disclosure can be implemented in an apparatus for wireless communication at a network entity. The apparatus includes a processor, memory coupled with the processor, and instructions stored in the memory. The instructions may be executable by the processor to cause the apparatus to output first control signaling including an energy saving mode indication that identifies: one or more energy saving modes of the network entity, one or more respective BWPs associated with each of the one or more energy saving modes, and one or more respective durations over which each of the one or more energy saving modes is to be used at the network entity, output second control signaling scheduling a data signal to be communicated between a UE and the network entity over a duration of the one or more respective durations over which an energy saving mode of the one or more energy saving modes is to be used at the network entity, and communicate the data signal: over the duration, in accordance with the energy saving mode, and using a BWP of the one or more respective BWPs associated with the energy saving mode.

Another innovative aspect of the subject matter described in this disclosure can be implemented in an apparatus for wireless communication at a network entity. The apparatus includes means for outputting first control signaling including an energy saving mode indication that identifies: one or more energy saving modes of the network entity, one or more respective BWPs associated with each of the one or more energy saving modes, and one or more respective durations over which each of the one or more energy saving modes is to be used at the network entity, means for outputting second control signaling scheduling a data signal to be communicated between a UE and the network entity over a duration of the one or more respective durations over which an energy saving mode of the one or more energy saving modes is to be used at the network entity, and means for communicating the data signal: over the duration, in accordance with the energy saving mode, and using a BWP of the one or more respective BWPs associated with the energy saving mode.

Another innovative aspect of the subject matter described in this disclosure can be implemented in a non-transitory computer-readable medium storing code for wireless communication at a network entity. The code includes instructions executable by a processor to output first control signaling including an energy saving mode indication that identifies: one or more energy saving modes of the network entity, one or more respective BWPs associated with each of the one or more energy saving modes, and one or more respective durations over which each of the one or more energy saving modes is to be used at the network entity, output second control signaling scheduling a data signal to be communicated between a UE and the network entity over a duration of the one or more respective durations over which an energy saving mode of the one or more energy saving modes is to be used at the network entity, and communicate the data signal: over the duration, in accordance with the energy saving mode, and using a BWP of the one or more respective BWPs associated with the energy saving mode.

Some of the method, apparatuses, and non-transitory computer-readable medium described herein may further include operations, features, means, or instructions for outputting third control signaling including an indication that identifies at least one BWP associated with a default operation mode of the network entity.

DETAILED DESCRIPTION

Figure 1:
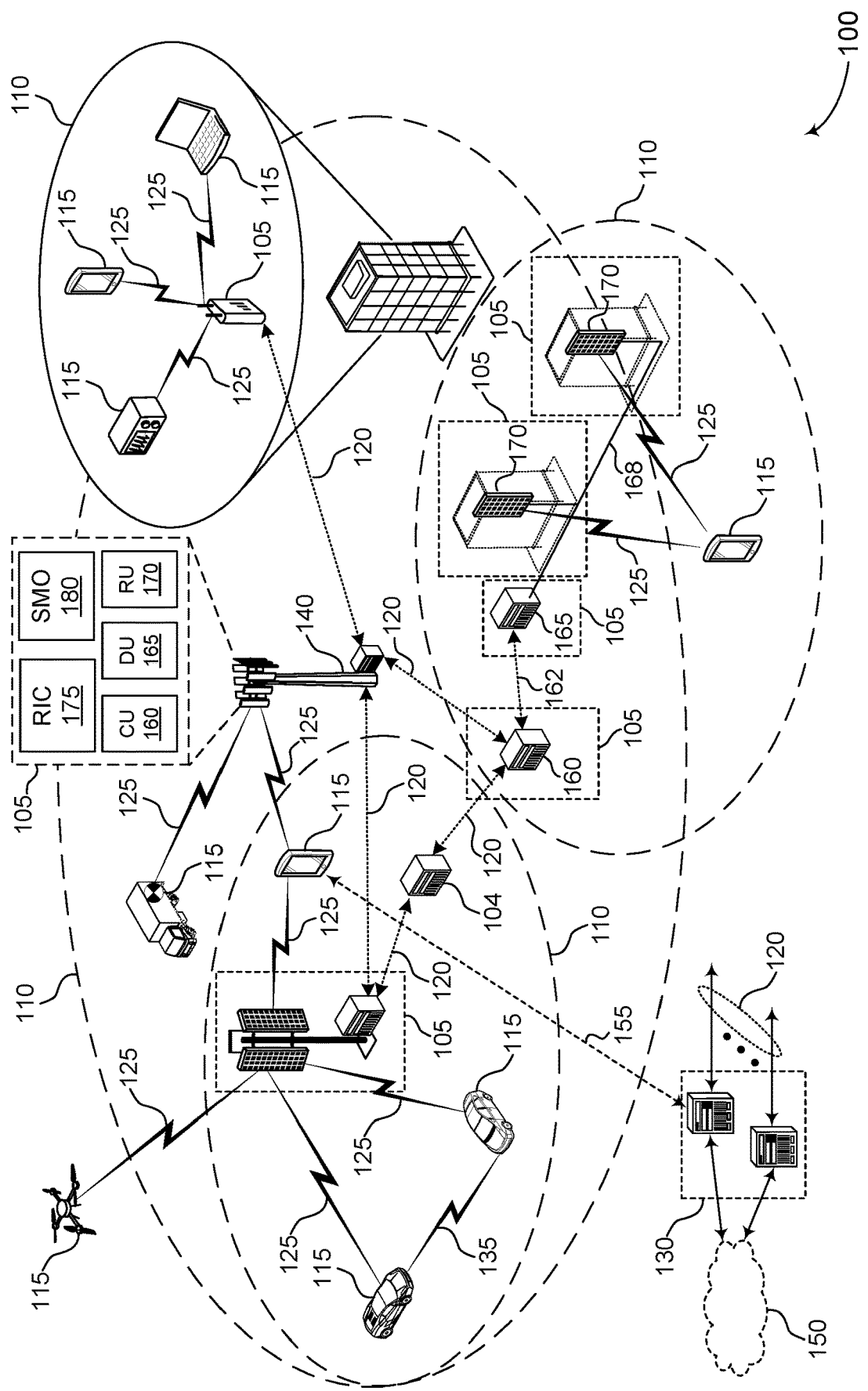
FIGS. 1 and 2 each illustrate an example of a wireless communication system that supports bandwidth-part-specific (BWP-specific) network operation modes in accordance with one or more aspects of the present disclosure.

In some wireless communication systems, operations performed at a network entity may lead to increased power consumption as well as increased cost associated with the increased power consumption. To conserve energy, the network entity may be capable of supporting, and transitioning between, multiple network operation modes that may each be associated with a respective set of one or more communication parameters such as bandwidth, transmit power, and antenna ports, among other examples. For instance, the network entity may determine to operate in an energy saving mode, in which a bandwidth used for communication with a user equipment (UE) may be reduced, such that the network entity may reduce power consumption while maintaining network operations. Additionally or alternatively, the network entity may determine to operate in a flexible mode in which the network entity may adapt an operation mode of the network entity, such as among one or more energy saving modes and one or more other operation modes, based on traffic conditions, among other examples. For example, while operating in the flexible mode, the network entity may transition to an energy saving mode in response to reduced traffic levels (e.g., due to serving a reduced quantity of UEs) and transition to another operation mode (e.g. a non-energy saving mode) in response to increased traffic levels (e.g., due to serving an increased quantity of UEs). The network entity may communicate indications of network operation mode changes to UEs served by the network entity. For instance, the network entity may transmit control signaling indicating that the network entity may transition (for example, switch) from a first network operation mode to a second network operation mode, or that a parameter associated with a particular network operation mode changed. In some cases, however, communicating relatively-frequent network operation mode changes to multiple UEs may be inefficient and lead to increased signaling overhead, among other disadvantages.

Various aspects generally relate to techniques for bandwidth-part-specific (BWP-specific) network operation modes, and more specifically, to a framework for associating energy saving modes of the network entity with one or more respective bandwidth parts (BWPs) for communication between the network entity and one or more UEs. For example, the network entity may indicate, to a UE, multiple operation modes, including multiple energy saving modes, associated with the network entity, and may associate each of the energy saving modes with a respective range of frequencies and a respective duration in which the energy saving mode may be used at the network entity. In some examples, the range of frequencies may occupy an entire BWP or may occupy only a portion of a BWP (for example, a "sub-BWP"). Based on the time and frequency resources in which a communication (for example, a transmission or reception of a data signal) is scheduled to be communicated, the UE may identify the particular energy saving mode used at the network entity. For example, the UE may identify an energy saving mode based on whether the time and frequency resources of the communication overlap with a BWP and a duration associated with the energy saving mode. Additionally or alternatively, the UE may determine a BWP to use for communication with the network entity based on an energy saving mode indicated to the UE. For example, the network entity may indicate an energy saving mode to the UE (for example, using control signaling), and the UE may determine to use a BWP associated with the indicated energy saving mode. In some examples, the network entity may also configure the UE to use a BWP that is not associated with any energy saving mode of the network entity. In such examples, the UE may determine that a default operating mode (for example, corresponding to non-energy saving operations) may be used at the network entity for the BWP.

Particular aspects of the subject matter described herein may be implemented to realize one or more of the following potential advantages. The techniques employed by the described communication devices may provide benefits and enhancements to the operation of the communication devices including reducing energy consumption while operating in one or more energy saving modes. For example, by associating each of multiple energy saving modes of the network with one or more respective BWPs, a network entity may reduce signaling overhead associated with indicating operation mode changes to UEs. In some implementations, operations performed by the described communication devices may support improvements to power consumption and efficiency of communication, among other benefits, based on associating energy saving modes of the network entity with one or more particular BWPs.

Aspects of the disclosure are initially described in the context of wireless communication systems. Aspects of the disclosure are also described in the context of timing diagrams and a process flow. Aspects of the disclosure are further illustrated by and described with reference to apparatus diagrams, system diagrams, and flowcharts that relate to BWP-specific network operation modes.

FIG. 1 illustrates an example of a wireless communication system 100 that supports BWP-specific network operation modes in accordance with one or more aspects of the present disclosure. The wireless communication system 100 may include one or more network entities 105, one or more UEs 115, and a core network 130. In some examples, the wireless communication system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communication system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (for example, a radio frequency (RF) access link). For example, a network entity 105 may support a coverage area 110 (for example, a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communication system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communication with various types of devices, such as other UEs 115 or network entities 105, as shown in FIG. 1.

As described herein, a node of the wireless communication system 100, which may be referred to as a network node, or a wireless node, may be a network entity 105 (for example, any network entity described herein), a UE 115 (for example, any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (for example, in accordance with an S1, N2, N3, or other interface protocol). In some examples, network entities 105 may communicate with one another via a backhaul communication link 120 (for example, in accordance with an X2, Xn, or other interface protocol) either directly (for example, directly between network entities 105) or indirectly (for example, via a core network 130). In some examples, network entities 105 may communicate with one another via one or both of a midhaul communication link 162 (for example, in accordance with a midhaul interface protocol) or a fronthaul communication link 168 (for example, in accordance with a fronthaul interface protocol). The backhaul communication links 120, midhaul communication links 162, or fronthaul communication links 168 may be or include one or more wired links (for example, an electrical link, an optical fiber link), one or more wireless links (for example, a radio link, a wireless optical link), among other examples or various combinations thereof. A UE 115 may communicate with the core network 130 via a communication link 155.

One or more of the network entities 105 described herein may include or may be referred to as a base station 140 (for example, a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (for example, a base station 140) may be implemented in an aggregated (for example, monolithic, standalone) base station architecture, which may be configured to utilize a protocol stack that is physically or logically integrated within a single network entity 105 (for example, a single RAN node, such as a base station 140).

In some examples, a network entity 105 may be implemented in a disaggregated architecture (for example, a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (for example, a network configuration sponsored by the O-RAN Alliance), or a virtualized RAN (vRAN) (for example, a cloud RAN (C-RAN)). For example, a network entity 105 may include one or more of one or more of a central unit (CU) 160, a distributed unit (DU) 165, a radio unit (RU) 170, a RAN Intelligent Controller (RIC) 175 (for example, a Near-Real Time RIC (Near-RT RIC), a Non-Real Time RIC (Non-RT RIC)), or a Service Management and Orchestration (SMO) 180 system. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (for example, separate physical locations). In some examples, one or more network entities 105 of a disaggregated RAN architecture may be implemented as virtual units (for example, a virtual CU (VCU), a virtual DU (VDU), a virtual RU (VRU)).

The split of functionality between a CU 160, a DU 165, and an RU 170 is flexible and may support different functionalities depending on which functions (for example, network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (for example, layer 3 (L3), layer 2 (L2)) functionality and signaling (for example, Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (for example, physical (PHY) layer) or L2 (for example, radio link control (RLC) layer, medium access control (MAC) layer) functionality and signaling, and may each be at least partially controlled by the CU 160. Additionally or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (for example, via one or more RUs 170). In some cases, a functional split between a CU 160 and a DU 165, or between a DU 165 and an RU 170 may be within a protocol layer (for example, some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (for example, F1, F1-c, F1-u), and a DU 165 may be connected to one or more RUs 170 via a fronthaul communication link 168 (for example, open fronthaul (FH) interface). In some examples, a midhaul communication link 162 or a fronthaul communication link 168 may be implemented in accordance with an interface (for example, a channel) between layers of a protocol stack supported by respective network entities 105 that are in communication via such communication links.

In wireless communication systems (for example, wireless communication system 100), infrastructure and spectral resources for radio access may support wireless backhaul link capabilities to supplement wired backhaul connections, providing an IAB network architecture (for example, to a core network 130). In some cases, in an IAB network, one or more network entities 105 (for example, IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (for example, a donor base station 140). The one or more donor network entities 105 (for example, IAB donors) may be in communication with one or more additional network entities 105 (for example, IAB nodes 104) via supported access and backhaul links (for example, backhaul communication links 120). IAB nodes 104 may include an IAB mobile termination (IAB-MT) controlled (for example, scheduled) by DUs 165 of a coupled IAB donor. An IAB-MT may include an independent set of antennas for relay of communication with UEs 115, or may share the same antennas (for example, of an RU 170) of an IAB node 104 used for access via the DU 165 of the IAB node 104 (for example, referred to as virtual IAB-MT (vIAB-MT)). In some examples, the IAB nodes 104 may include DUs 165 that support communication links with additional entities (for example, IAB nodes 104, UEs 115) within the relay chain or configuration of the access network (for example, downstream). In such cases, one or more components of the disaggregated RAN architecture (for example, one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support BWP-specific network operation modes as described herein. For example, some operations described as being performed by a UE 115 or a network entity 105 (for example, a base station 140) may Additionally or alternatively, be performed by one or more components of the disaggregated RAN architecture (for example, IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communication (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (for example, an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (for example, a BWP) that is operated according to one or more physical layer channels for a given radio access technology (for example, LTE, LTE-A, LTE-A Pro, NR). Each physical layer channel may carry acquisition signaling (for example, synchronization signals, system information), control signaling that coordinates operation for the carrier, user data, or other signaling. The wireless communication system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (for example, entity, sub-entity) of a network entity 105. For example, the terms "transmitting," "receiving," or "communicating," used with reference to a network entity 105, may refer to any portion of a network entity 105 (for example, a base station 140, a CU 160, a DU 165, a RU 170) of a RAN communicating with another device (for example, directly or via one or more other network entities 105).

A carrier may be associated with a particular bandwidth of the RF spectrum and, in some examples, the carrier bandwidth may be referred to as a "system bandwidth" of the carrier or the wireless communication system 100. For example, the carrier bandwidth may be one of a set of bandwidths for carriers of a particular radio access technology (for example, 1.4, 3, 5, 10, 15, 20, 40, or 80 megahertz (MHz)). Devices of the wireless communication system 100 (for example, the network entities 105, the UEs 115, or both) may have hardware configurations that support communication using a particular carrier bandwidth or may be configurable to support communication using one of a set of carrier bandwidths. In some examples, the wireless communication system 100 may include network entities 105 or UEs 115 that support concurrent communication using carriers associated with multiple carrier bandwidths. In some examples, each served UE 115 may be configured for operating using portions (for example, a sub-band, a BWP) or all of a carrier bandwidth.

Signal waveforms transmitted via a carrier may be made up of multiple subcarriers (for example, using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol duration (for example, a duration of one modulation symbol, a symbol period) and one subcarrier, in which case the symbol duration and subcarrier spacing may be inversely related. The quantity of bits carried by each resource element may depend on the modulation scheme (for example, the order of the modulation scheme, the coding rate of the modulation scheme, or both), such that a relatively higher quantity of resource elements (for example, in a transmission duration) and a relatively higher order of a modulation scheme may correspond to a relatively higher rate of communication. A wireless communication resource may refer to a combination of an RF spectrum resource, a time resource, and a spatial resource (for example, a spatial layer, a beam), and the use of multiple spatial resources may increase the data rate or data integrity for communication with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communication for the UE 115 may be restricted to one or more active BWPs.

The time intervals for the network entities 105 or the UEs 115 may be expressed in multiples of a basic time unit which may, for example, refer to a sampling duration of $T_s=1/(\Delta f_{max} \cdot N_f)$ seconds, for which $\Delta f_{max}$ may represent a supported subcarrier spacing, and $\Delta_f$ may represent a supported discrete Fourier transform (DFT) size. Time intervals of a communication resource may be organized according to radio frames each having a specified duration (for example, 10 milliseconds (ms)). Each radio frame may be identified by a system frame number (SFN) (for example, ranging from 0 to 1023).

Each frame may include multiple consecutively-numbered subframes or slots, and each subframe or slot may have the same duration. In some examples, a frame may be divided (for example, in the time domain) into subframes, and each subframe may be further divided into a quantity of slots. Alternatively, each frame may include a variable quantity of slots, and the quantity of slots may depend on subcarrier spacing. Each slot may include a quantity of symbol durations (for example, depending on the length of the cyclic prefix prepended to each symbol duration). In some wireless communication systems 100, a slot may further be divided into multiple mini-slots associated with one or more symbols. Excluding the cyclic prefix, each symbol duration may be associated with one or more (for example, $N_f$) sampling durations. The duration of a symbol duration may depend on the subcarrier spacing or frequency band of operation.

A subframe, a slot, a mini-slot, or a symbol may be the smallest scheduling unit (for example, in the time domain) of the wireless communication system 100 and may be referred to as a transmission time interval (TTI). In some examples, the TTI duration (for example, a quantity of symbol durations in a TTI) may be variable. Additionally or alternatively, the smallest scheduling unit of the wireless communication system 100 may be dynamically selected (for example, in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (for example, a control resource set (CORESET)) for a physical control channel may be defined by a set of symbol durations and may extend across the system bandwidth or a subset of the system bandwidth of the carrier. One or more control regions (for example, CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (for example, control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (for example, a base station 140, an RU 170) may be movable and provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communication system 100 may include, for example, a heterogeneous network in which different types of the network entities 105 provide coverage for various coverage areas 110 using the same or different radio access technologies.

Some UEs 115 may be configured to employ operating modes that reduce power consumption, such as half-duplex communication (for example, a mode that supports one-way communication via transmission or reception, but not transmission and reception concurrently). In some examples, half-duplex communication may be performed at a reduced peak rate. Other power conservation techniques for the UEs 115 include entering a power saving deep sleep mode over durations in which the UE 115 may not be engaging in active communication, operating using a limited bandwidth (for example, according to narrowband communication), or a combination of these techniques. For example, some UEs 115 may be configured for operation using a narrowband protocol type that is associated with a defined portion or range (for example, set of subcarriers or resource blocks (RBs)) within a carrier, within a guard-band of a carrier, or outside of a carrier.

The wireless communication system 100 may be configured to support ultra-reliable communication or low-latency communication, or various combinations thereof. For example, the wireless communication system 100 may be configured to support ultra-reliable low-latency communication (URLLC). The UEs 115 may be designed to support ultra-reliable, low-latency, or critical functions. Ultra-reliable communication may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (for example, in accordance with a peer-to-peer (P2P), D2D, or sidelink protocol). In some examples, one or more UEs 115 of a group that are performing D2D communication may be within the coverage area 110 of a network entity 105 (for example, a base station 140, an RU 170), which may support aspects of such D2D communication being configured by (for example, scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communication may support a one-to-many (1:M) system in which each UE 115 transmits to each of the other UEs 115 in the group. In some examples, a network entity 105 may facilitate the scheduling of resources for D2D communication. In some other examples, D2D communication may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (for example, a mobility management entity (MME), an access and mobility management function (AMF)) and at least one user plane entity that routes packets or interconnects to external networks (for example, a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (for example, base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communication system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communication using UHF waves may be associated with smaller antennas and shorter ranges (for example, less than 100 kilometers) relative to communication using the smaller frequencies and longer waves of the high frequency (HF) or very high frequency (VHF) portion of the spectrum below 300 MHz.

The wireless communication system 100 may utilize both licensed and unlicensed RF spectrum bands. For example, the wireless communication system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (for example, LAA). Operations using unlicensed spectrum may include downlink transmissions, uplink transmissions, P2P transmissions, or D2D transmissions, among other examples.

A network entity 105 (for example, a base station 140, an RU 170) or a UE 115 may be equipped with multiple antennas, which may be used to employ techniques such as transmit diversity, receive diversity, multiple-input multiple-output (MIMO) communication, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communication with a UE 115. Likewise, a UE 115 may include one or more antenna arrays that may support various MIMO or beamforming operations. Additionally or alternatively, an antenna panel may support RF beamforming for a signal transmitted via an antenna port.

The network entities 105 or the UEs 115 may use MIMO communication to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (for example, the same codeword) or different data streams (for example, different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (for example, a network entity 105, a UE 115) to shape or steer an antenna beam (for example, a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (for example, with respect to the antenna array of the transmitting device or receiving device, or with respect to some other orientation).

A network entity 105 or a UE 115 may use beam sweeping techniques as part of beamforming operations. For example, a network entity 105 (for example, a base station 140, an RU 170) may use multiple antennas or antenna arrays (for example, antenna panels) to conduct beamforming operations for directional communication with a UE 115. Some signals (for example, synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (for example, by a transmitting device, such as a network entity 105, or by a receiving device, such as a UE 115) a beam direction for later transmission or reception by the network entity 105.

Some signals, such as data signals associated with a particular receiving device, may be transmitted by transmitting device (for example, a transmitting network entity 105, a transmitting UE 115) along a single beam direction (for example, a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (for example, by a network entity 105 or a UE 115) may be performed using multiple beam directions, and the device may use a combination of digital precoding or beamforming to generate a combined beam for transmission (for example, from a network entity 105 to a UE 115). The UE 115 may report feedback that indicates precoding weights for one or more beam directions, and the feedback may correspond to a configured set of beams across a system bandwidth or one or more sub-bands. The network entity 105 may transmit a reference signal (for example, a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (for example, a multi-panel type codebook, a linear combination type codebook, a port selection type codebook). Although these techniques are described with reference to signals transmitted along one or more directions by a network entity 105 (for example, a base station 140, an RU 170), a UE 115 may employ similar techniques for transmitting signals multiple times along different directions (for example, for identifying a beam direction for subsequent transmission or reception by the UE 115) or for transmitting a signal along a single direction (for example, for transmitting data to a receiving device).

A receiving device (for example, a UE 115) may perform reception operations in accordance with multiple receive configurations (for example, directional listening) such as in examples in which the UE 115 may be receiving various signals from a receiving device (for example, a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (for example, different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (for example, such as in examples in which the receiving device may be receiving a data signal). The single receive configuration may be aligned along a beam direction determined based on listening according to different receive configuration directions (for example, a beam direction determined to have a highest signal strength, highest signal-to-noise ratio (SNR), or otherwise acceptable signal quality based on listening according to multiple beam directions).

In the wireless communication system 100, a network entity 105 may support, and be capable of transitioning between, multiple operation modes of the network entity 105 (for example, network operation modes) that may be associated with multiple (for example, different) communication parameters, such as bandwidth, transmit power, RF chains, and antenna ports, among other examples. The network entity 105 may communicate network operation mode changes to one or more UEs 115 being served by the network entity 105. In some cases, however, communicating relatively frequent network operation mode changes to the one or more UEs 115 may be inefficient and lead to increased signaling overhead. In some examples, to increase efficiency and improve communication between the one or more UEs 115 and the network entity 105, the network entity 105 may associate network operation modes, such as one or more energy saving modes of the network entity 105, with one or more BWPs.

For example, the UE 115 may receive first control signaling including an energy saving mode indication that identifies one or more energy saving modes of the network entity 105, one or more respective BWPs associated with each of the one or more energy saving modes, and one or more respective durations over which each of the one or more energy saving modes is to be used at the network entity 105. The UE 115 may receive second control signaling scheduling a data signal to be communicated between the UE 115 and the network entity 105. In some examples, the control signaling may schedule the data signal to be communicated over a duration (for example, of the one or more respective durations) over which an energy saving mode (for example, of the one or more energy saving modes) is to be used at the network entity 105. In such examples, the UE 115 may communicate (for example, may transmit to the network entity 105 or receive from the network entity 105) the data signal over the duration in accordance with the energy saving mode and using a BWP (for example, of the one or more respective BWPs) associated with the energy saving mode. In some examples, communicating the data signal in accordance with the energy saving mode and using the BWP associated with the energy saving mode may reduce overhead and increase efficiency of communication between the UE 115 and the network entity 105, among other advantages.

Figure 2:
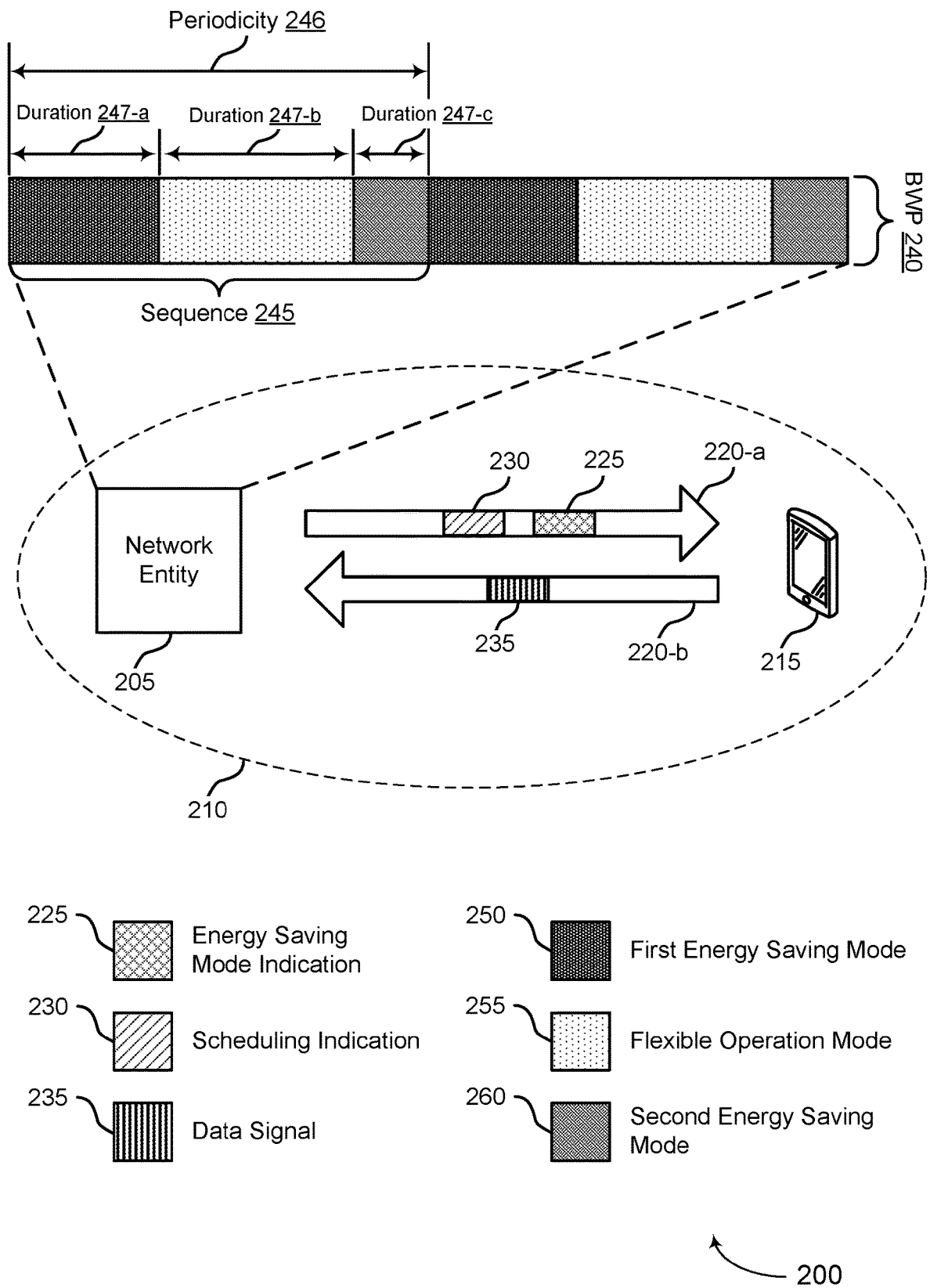

FIG. 2 illustrates an example of a wireless communication system 200 that supports BWP-specific network operation modes in accordance with one or more aspects of the present disclosure. The wireless communication system 200 may implement or be implemented at one or more aspects of the wireless communication system 100. For example, the wireless communication system 200 may include a UE 215 and a network entity 205, which may be examples of the corresponding devices as described in the present disclosure including with reference to FIG. 1. The UE 215 and network entity 205 may communicate within a coverage area 210, which may be an example of a coverage area 110 as described in the present disclosure including with reference to FIG. 1. Additionally or alternatively, the UE 215 and the network entity 205 may communicate using one or more communication links 220 (for example, a communication link 220-a and a communication link 220-b), which may be examples of a communication link 125 as described in the present disclosure including with reference to FIG. 1. In the example of FIG. 2, the communication link 220-a may be an example of a downlink and the communication link 220-b may be an example of an uplink.

In some examples, operations performed at the network entity 205 may lead to increased power consumption and increased costs (for example, due to the increased energy consumption) within the wireless communication system 200. For example, a communication network, such as a cellular network, may incur relatively high cost from network energy consumption associated with operating (for example, to run) the cellular network. In some examples, a portion (for example, about 23%) of network expenses (for example, of a total expense) may be due to operations of the cellular network (for example, within the wireless communication system 200). In such examples, a relatively large portion (for example, most or about 50% in 5G) of the network energy consumption may be due to one or more RANs, such as the network entity 205. In some examples, some network energy savings features (for example, implemented at the one or more RANs, such as the network entity 205) may provide one or more benefits for adoption and expansion of cellular networks.

In some examples, the network energy savings features may include (for example, consider) energy consumption modes. For example, some network energy savings features may define a network entity energy consumption model (for example, a base station energy consumption model, a RAN energy consumption model). In some examples, the network entity energy consumption model may adapt some frameworks of power consumption modelling and evaluation methodology, such as frameworks of power consumption modelling and evaluation methodology for UEs, to network entities (for example, to the base station side, the gNB side). In some examples, such frameworks may include relative energy consumption for downlink communication and uplink communication performed at network entities (for example, considering factors such as power amplifier efficiency, a quantity of transmission RUs, and base station load), sleep states of the network entities, transition times associated with sleep states of the network entities, and one or more reference parameters or configurations (or both parameters and configurations).

Additionally or alternatively, the network energy savings features may define an evaluation methodology and key performance indicators (KPIs). The evaluation methodology may target evaluating system-level network energy consumption and energy savings gains, as well as assessing or balancing (or both) an impact (for example, of network entity energy consumption) to network performance, user performance (for example, spectral efficiency, capacity, user perceived throughput (UPT), latency, handover performance, call drop rate, initial access performance, service-level agreement (SLA) assurance related KPIs), energy efficiency, UE power consumption, and UE complexity. Additionally or alternatively, the evaluation methodology may provide for multiple KPIs (for example, may refrain from focusing on a single KPI), and may reuse some KPIs. In some examples, such as examples in which some KPIs may be insufficient, additional (for example, new) KPIs may be developed. A work group may determine one or more KPIs to evaluate and may also determine how to evaluate the one or more KPIs.

Additionally or alternatively, some network energy savings features may include (for example, study and identify) techniques for the network entity 205 and the UE 215 (for example, on the gNB side and the UE side) to improve network energy savings (for example, with respect to both network entity transmission and network entity reception). In some examples, such techniques may provide for increased efficiency of operations (for example, dynamically, semi-statically, or both) and increased granularity (for example, relatively finer granularity) associated with adaptation of transmissions or receptions (or both) in one or more of network energy saving techniques (for example, in one or more of a time domain, a frequency domain, a spatial domain, or a power domain) with potential support or feedback from the UE 215 (for example, including potential UE assistance information). In some examples, such techniques may include information exchange or coordination (or both) over one or more network interfaces and may include one or more other techniques (for example, other techniques to improve network energy savings may not be precluded).

In some examples, the network energy savings features may include energy saving operation modes of the network entity, such as sleep modes or one or more other energy saving modes of the network entity. For example, network energy savings (and power saving) may use (for example, take, implement) multiple modes and operations to save (for example, conserve) energy and maintain network operation. That is, to conserve energy, the network entity 205 may be capable of supporting (and transitioning between) multiple operation modes of the network entity 205 (for example, network operation modes, such as energy saving modes that may include one or more sleep modes). In some examples, a network operation mode, as described in the present disclosure, may refer to one or more particular operations performed at the network (for example, at the network entity 205). Additionally or alternatively, a network energy saving mode, as described in the present disclosure, may refer to one or more particular operations performed at the network entity 205 to conserve energy. The network operation modes may be associated with multiple (for example, different) communication parameters, such as bandwidth, transmit power, antenna ports, and RF chains, among other examples. In some examples, the network entity 205 may enter different network operation modes, such as different sleep modes, based on traffic. For example, each sleep mode may be associated with one or more operations (for example, different operations performed at the network entity 205 as part of the respective sleep mode) and the network entity 205 may determine to enter a particular sleep mode (for example, perform particular operations) based operations of the network entity that may be suitable for traffic conditions (for example, current traffic conditions). In some examples, entering some sleep mode may include deactivating (for example, turning off) one or more RF chains at the network entity 205, while entering some other sleep modes may include activating one or more (for example, some or all) RF chains at the network entity 205. Additionally or alternatively, the sleep modes may be associated with (for example, have, result in) multiple (for example, different) quantities of power consumption and may use multiple transition durations (for example, quantities of time). For example, the network entity 205 may use a first duration to transition to a first sleep mode and a second duration (for example, different than the first duration) to transition to a second sleep mode.

In some examples, the network entity 205 may transition (for example, switch) between energy saving modes of the network semi-statically. That is, the network entity 205 may be configured for a semi-static approach for network operations, in which the network entity 205 may support a first energy saving mode 250 (for example, NES1) and a second energy saving mode 260 (for example, NES2) for particular durations (for example, fixed durations). Additionally or alternatively, the network entity 205 may support a flexible mode (e.g., a flexible operation mode 255). The flexible operation mode 255 may correspond to an operation mode in which the network entity 205 may switch network operations between multiple operation modes (e.g., one or more energy saving modes and one or more other operation modes) based on traffic conditions, among other examples. For example, the flexible operation mode 255 may include the network entity 205 transitioning to an energy saving mode for reduced traffic levels and to another operation mode (e.g. a non-energy saving mode) for increased traffic levels. Additionally or alternatively, the flexible operation mode 255 may be a network operation mode, in which operations of the network entity 205 may be flexible and dynamically indicated to the UE 215, for example based on traffic conditions (for example, current traffic conditions). That is, over the flexible operation mode 255, the network entity 205 may transmit control signaling, such as a downlink control information (DCI), that may indicate, to the UE 215, a network operation mode to be used at the network entity 205. In such an example, the indicated network operation mode may supersede (for example, overwrite) a previously indicated network operation mode (for example, a network operation mode indicated via other signaling, such as RRC signaling). In some examples, the network entity 205 may support a default operation mode that may correspond to non-energy saving operations (for example, normal network operation).

In some examples, the network entity 205 may apply different network energy saving techniques (for example, may operate in different energy saving modes), such as reducing a quantity of antenna ports, or reducing a transmit power, among other techniques. For example, the network entity 205 may operate in an energy saving mode (or one or more other energy saving modes) for reduced traffic levels. The energy saving mode may include reducing a quantity of active antenna ports at the network entity 205 or reducing a transmit power used at the network entity 205 for communication with the UE 215 (or both). Additionally or alternatively, the network entity 205 may refrain from operating in the energy saving mode (or one or more other energy saving modes) for increased traffic levels. That is, for increased traffic levels, the network entity 205 may operate according to a network operation mode that may include increasing a quantity of active antenna ports at the network entity 205 or increasing a transmit power used at the network entity 205 for communication with the UE 215 (or both). The network entity 205 may communicate network operation mode changes to the UE 215 (for example, a UE being served by the network entity 205). In some examples, however, communicating relatively frequent network operation mode changes to the UE 215 (and one or more other UEs) may be inefficient and lead to increased signaling overhead.

In some examples, techniques for BWP-specific network operation modes, as described in the present disclosure, may provide one or more enhancements to communicating network operation mode changes to the UE 215. For example, the network entity 205 may achieve one or more potential advantages by configuring multiple BWPs (for example, each BWP of multiple BWPs used for communication with the UE 215) with a respective sequence of network operation modes. In some examples, a sequence of network operation modes, as described in the present disclosure, may refer to a set of multiple network operation modes arranged in a particular order (for example, in the time domain). In some examples, network operation modes may include one or more of one or more network energy saving modes, one or more flexible operation modes, or one or more default operation modes.

For example, the network entity 205 may configure multiple BWPs with respective sequences of network operation modes to achieve increased specificity of network energy saving operations. That is, the network entity 205 may identify (for example, design, determine, assign, configure) a network energy saving mode for a particular BWP that may be suitable for network operations of the network energy saving mode. That is, the network entity 205 may configure energy saving modes with respective BWPs and respective BWP-specific configurations. In some examples, configuring energy saving modes with respective BWPs may enable the network entity 205 to achieve increased flexibility and provide for network operations to be switched (for example, jointly) with BWP switches. That is, configuring energy saving modes with respective BWPs may enable transitions between energy saving modes (or one or more other network operation modes) at the network entity 205 to be associated with transitions between BWPs used for communication at the network entity 205 (for example, communication between the UE 215 and the network entity 205). For example, a BWP with a relatively large bandwidth may accommodate a reduction in active antenna elements or a transmit power at the network entity 205 (for example, while maintaining network operations). As such, each BWP (for example, of multiple BWPs used for communication between the UE 215 and the network entity 205) may be tuned (for example, fit) for a particular set of network operations. For example, the network entity 205 may associate relatively small BWPs with energy saving modes that may be used at the network entity 205, such as in examples in which traffic conditions may be reduced.

In some examples, the network entity 205 may be configured for one or more network energy savings operation (for example, one or more energy saving modes of the network entity 205 or one or more sequences of energy saving modes of the network entity 205) per BWP. For example, to increase efficiency and improve communication between the UE 215 and the network entity 205, the network entity 205 may associate some energy saving modes with particular BWPs. As illustrated in the example of FIG. 2, the network entity 205 may associate a sequence 245 (for example, including a first energy saving mode 250, a flexible operation mode 255, and a second energy saving mode 260) with a BWP 240. In some examples, the sequence 245 may have (for example, may repeat according to) a periodicity 246.

As illustrated in the example of FIG. 2, the UE 215 may receive first control signaling including an energy saving mode indication 225. The energy saving mode indication 225 may identify one or more energy saving modes of the network entity 205 (for example, the first energy saving mode 250, the flexible operation mode 255, and the second energy saving mode 260), one or more respective BWPs associated with each of the one or more energy saving modes (for example, the BWP 240), and one or more respective durations over which each of the one or more energy saving modes may be used at the network entity 205 (for example, a duration 247-a, a duration 247-b, and a duration 247-c). In some examples, the durations (for example, the duration 247-a, the duration 247-b, and the duration 247-c) may be indicated, to the UE 215, as quantities of symbols, quantities of slots, quantities of subframes, or quantities of ms, among other examples.

The UE 215 may receive second control signaling including a scheduling indication 230. The scheduling indication 230 may schedule a data signal 235 to be communicated between the UE 215 and the network entity 205 over a duration (for example, of the one or more respective durations) over which an energy saving mode (for example, of the one or more energy saving modes) may be used at the network entity 205. In such examples, the UE 215 may communicate the data signal 235 over the duration in accordance with the energy saving mode (for example, the energy saving mode associated with the duration) and using a BWP (for example, a BWP of the one or more respective BWPs) associated with the energy saving mode. In some examples, communicating the data signal 235 in accordance with the energy saving mode and using the BWP associated with the energy saving mode may reduce overhead and increase efficiency of communication between the UE 215 and the network entity 205, among other benefits.

Figure 3:
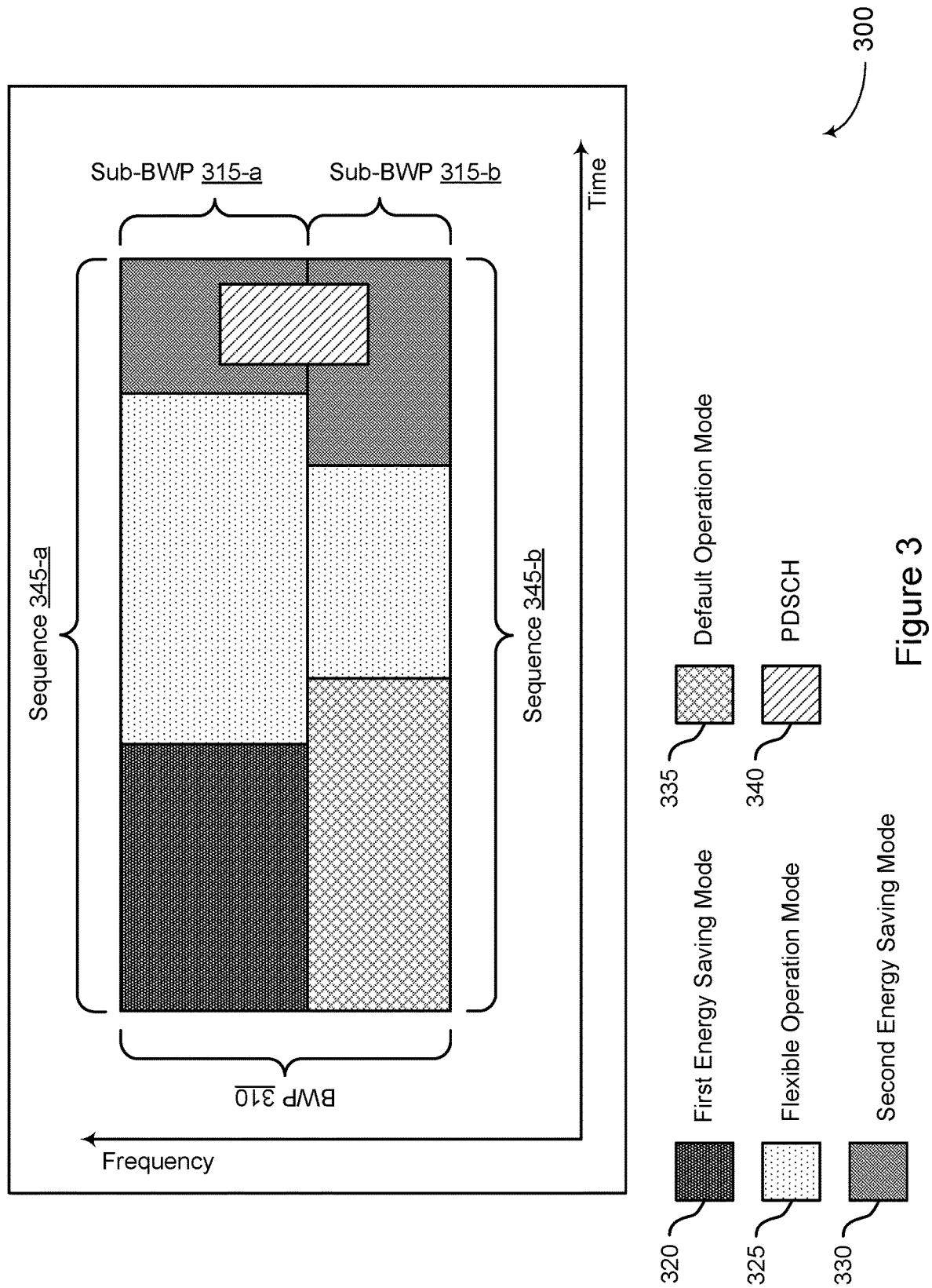
FIGS. 3, 4A, and 4B each illustrate an example of a timing diagram that supports BWP-specific network operation modes in accordance with one or more aspects of the present disclosure.

FIG. 3 illustrates an example of a timing diagram 300 that supports BWP-specific network operation modes in accordance with one or more aspects of the present disclosure. The timing diagram 300 may implement or be implemented at one or more aspects of the wireless communication system 100 and the wireless communication system 200. For example, the timing diagram 300 may be implemented at a UE and a network entity, which may be examples of the corresponding devices as described in the present disclosure including with reference to FIGS. 1 and 2.

In some examples, the network entity and the UE may support a framework for associating energy saving modes of the network entity (for example, network energy saving modes) with BWPs. For example, for each BWP (for example, of multiple BWPs used for communication between the UE and the network entity), the network entity may configure the UE with a sequence of operations modes of the network entity (for example, a sequence of network operation modes). In some examples, the network entity may indicate, to the UE (for example, using an energy saving mode indication) multiple sequences of network operations on multiple (for example, different) frequency ranges of the BWP or on multiple BWPs (or both). As illustrated in the example of FIG. 3, the network entity may configure each frequency range of a BWP 310 (for example, a frequency range associated with a sub-BWP 315-a and a frequency range associated with a BWP-b) with a respective sequence of network operation modes (for example, network operations corresponding to different network operation modes of the network entity). For example, the energy saving mode indication may identify that the sub-BWP 315-a may be associated with a sequence 345-a that may include a first energy saving mode 320, a flexible operation mode 325, and a second energy saving mode 330. Additionally or alternatively, the energy saving mode indication may identify that the sub-BWP 315-b may be associated with a sequence 345-b that may include a default operation mode 335, the flexible operation mode 325, and the second energy saving mode 330. In some examples, such as examples in which a BWP may be unassociated with a sequence of network operations (for example, may be unidentified by the energy saving mode indication), the UE may determine (for example, assume) that a default network operation mode (for example, the default operation mode 335) may be used at the network entity for the BWP. In some examples, such as examples in which the UE is configured to communicate with the network entity using a BWP that is unidentified in the energy saving mode indication (for example, the UE may receive a scheduling indication scheduling a data signal to be communicated between the UE and the network entity using the BWP) the UE may determine to communicate with the network entity in accordance with the default operation mode 335. Additionally or alternatively, some BWPs, such as a BWP used for initial access (for example, an initial access BWP), may be associated with (for example, follow) the default operation mode 335. In some examples, by associating some BWPs, such as the initial access BWP, with the default operation mode 335, the network entity may provide for particular network operations to be performed at the network entity 205 for transmissions using the BWPs (for example, as part of the default operation mode 335).

In some examples, the network entity may configure each frequency range (for example, the BWP 310, the sub-BWP 315-a, the sub-BWP 315-b) at the UE using signaling, which may be or include control signaling, such as RRC signaling. For example, the network entity may RRC configure the sub-BWP 315-a and the sub-BWP 315-b within the BWP 310. In some examples, the network entity may configure a frequency range (for example, indicated to the UE) using a frequency of a resource block (RB) and a quantity of RBs included in the frequency range (for example, a quantity of RBs that correspond to a length of the respective frequency range). For example, the network entity may indicate, to the UE, an RB (or one or more frequencies associated with the RB) that may correspond to a relatively first RB of the frequency range (for example, a beginning of the frequency range) and a quantity of RBs include within the frequency range (for example, including the relatively first RB or measured from the relatively first RB).

In some examples, the network entity may schedule (for example, configure, mitigate) communication (for example, transmissions or receptions) according to the sequences of network operations (for example, the sequence 345-a and the sequence 345-b). For example, the network entity may configure the UE with one or more rules for communicating with the network entity in accordance the sequence 345-a and the sequence 345-b. In some examples, according to the one or more rules, the UE may not expect downlink or uplink transmissions to overlap (for example, in a time domain or a frequency domain) with more than one type of network operation mode. That is, the network entity may refrain from transmitting (for example, and the UE may refrain from receiving) grants that schedule communication (for example, transmissions or receptions), which overlap in the time domain or the frequency domain with multiple (for example, different) types of network operation modes.

As illustrated in the example of FIG. 3, the network entity may configure the UE with downlink shared channel transmissions (for example, using a physical downlink shared channel (PDSCH), such as a PDSCH 340) that overlap with the sub-BWP 315-*a* and the sub-BWP 315-*b* over a duration, in which the sub-BWP 315-*a* and the sub-BWP 315-*b* are both associated with the second energy saving mode 330. In some examples, such as examples in which a network operation mode (for example, the second energy saving mode 330) of a first frequency range (for example, the sub-BWP 315-*a*) is a same type of network operation mode as a network operation mode of a second frequency range (for example, the sub-BWP 315-*b*), the network entity may schedule transmissions (for example, using the PDSCH 340) that overlap in frequency with the first frequency range and the second frequency range. Additionally or alternatively, the network entity may refrain from scheduling transmissions (for example, downlink transmissions using a downlink channel, such as the PDSCH 340, or uplink transmissions using an uplink channel, such as a physical uplink shared channel (PUSCH)) that overlap in frequency (for example, overlap with the sub-BWP 315-*a* and the sub-BWP 315-*b*) over a duration in which the sub-BWP 315-*a* and the sub-BWP 315-*b* may be associated with different network operation modes. For example, the network entity may refrain from scheduling transmissions over a duration in which the sub-BWP 315-*a* may be associated with the first energy saving mode 320 and the sub-BWP 315-*b* may be associated with the default operation mode 335.

Additionally or alternatively, in accordance with the one or more rules, the network entity may refrain from scheduling transmissions (for example, downlink transmissions using a downlink channel, such as the PDSCH 340, or uplink transmissions using an uplink channel) for a range of frequencies (for example, the sub-BWP 315-*a* or the sub-BWP 315-*b*) over a duration in which the range of frequencies may be associated with different types of network operation modes. For example, the network entity may refrain from scheduling transmissions over a duration in which the sub-BWP 315-*a* may be associated with the first energy saving mode 320 and the flexible operation mode 325 or a duration in which the sub-BWP 315-*b* may be associated with the default operation mode 335 and the flexible operation mode 325. In some examples, configuring the UE with one or more rules for communicating with the network entity in accordance the sequence 345-*a* and the sequence 345-*b* may increase the efficiency (and accuracy) of communication between the network entity and the UE, among other possible benefits.

Figure 4A:
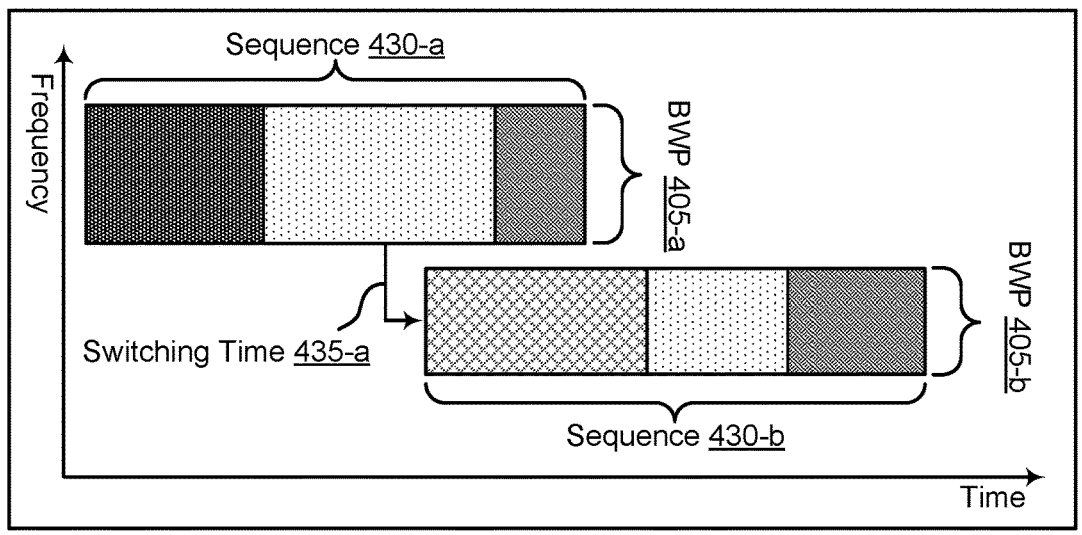
Figure 4A:
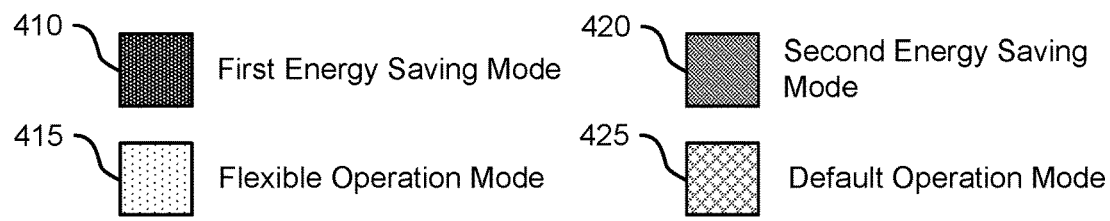

FIG. 4A illustrates an example of a timing diagram 400-*a* that supports BWP-specific network operation modes in accordance with one or more aspects of the present disclosure. The timing diagram 400-*a* may implement or be implemented at one or more aspects of the wireless communication system 100, the wireless communication system 200, and the timing diagram 300. For example, the timing diagram 400-*a* may be implemented at a UE and a network entity, which may be examples of the corresponding devices as described in the present disclosure including with reference to FIGS. 1-3.

In some examples, the network entity and the UE may support a framework for associating energy saving modes of the network entity with BWPs. For example, the network entity may configure the UE (for example, using control signaling, such as RRC signaling) with a sequence of operation modes of the network entity (for example, network operation modes) associated with a BWP 405-*a* (for example, a sequence 430-*a* including a first energy saving mode 410, a flexible operation mode 415, and a second energy saving mode 420). Additionally or alternatively, the network entity may configure the UE with a sequence of network operation modes associated with a BWP 405-*b* (for example, a sequence 430-*b* including a default operation mode 425, the flexible operation mode 415, and the second energy saving mode 420).

In some examples, the network entity may configure the UE (for example, using an indication) to transition between BWPs (for example, between the BWP 405-*a* and the BWP 405-*b* or one or more other BWPs) in accordance with the framework. In some examples, such as examples in which the network transmits an indication (for example, dynamically, such as using a DCI) for the UE to transition (for example, switch) to a BWP associated with a particular network operation mode (for example, an energy saving mode of the network entity), the UE may switch operations to (for example, may communicate according to) a network operation mode associated with the BWP (for example, the indicated BWP, the BWP that the UE switched to). In some examples, the indicated BWP may be associated with a sequence of network operation modes. In such examples, the network entity may configure the UE to operate in accordance with a relatively first network operation mode of the sequence of network operation modes associated with the BWP (for example, the new active BWP, the BWP that the UE switched to). That is, the sequence of network operation modes of the indicated BWP may begin from a relatively first network operation mode of the sequence.

As illustrated in the example of FIG. 4A, the UE may receive an indication to switch from the BWP 405-*a* to the BWP 405-*b* at time a switching time 435-*a*. In response to receiving the indication, the UE may switch from using the BWP 405-*a* (for example, for communication with the network entity) to using the BWP 405-*b*. Accordingly, the UE may determine to switch from communicating with the network entity in accordance with a network operation mode associated with the BWP 405-*a* (for example, a network operation mode with a duration that overlaps with the switching time 435-*a*, the flexible operation mode 415 of the sequence 430-*a*) to a relatively first network operation mode of the sequence 430-*b* associated with the BWP 405-*b* (for example, the default operation mode 425). That is, the time at which the UE transitions from using the BWP 405-*a* to the BWP 405-*b* (for example, the switching time 435-*a*) may correspond to a beginning of a duration of the default operation mode 425 and a beginning of the sequence 430-*b*. In some examples, configuring the sequence 430-*b* to begin at the switching time 435-*a* may increase the efficiency of communication between the network entity and the UE, among other possible benefits.

Figure 4B:
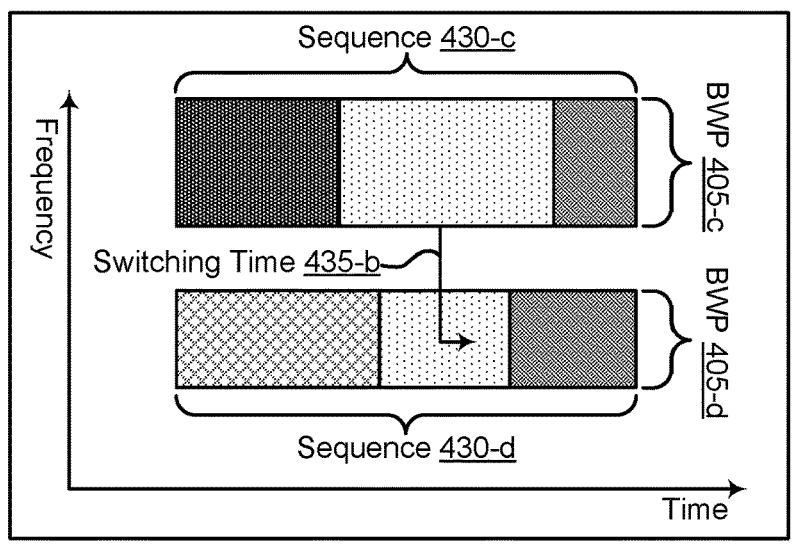
Figure 4B:
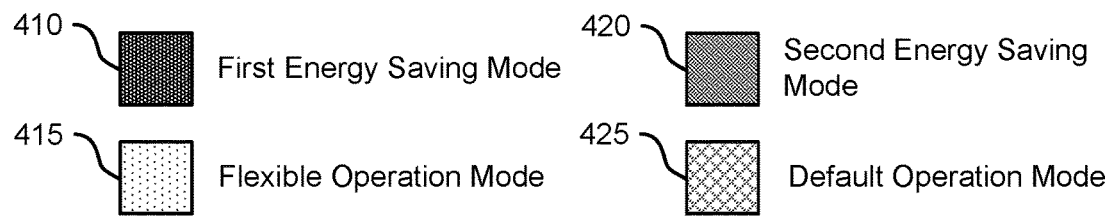

FIG. 4B illustrates an example of a timing diagram 400-*b* that supports BWP-specific network operation modes in accordance with one or more aspects of the present disclosure. The timing diagram 400-*b* may implement or be implemented at one or more aspects of the wireless communication system 100, the wireless communication system 200, the timing diagram 300, and the timing diagram 400-*a*. For example, the timing diagram 400-*b* may be implemented at a UE and a network entity, which may be examples of the corresponding devices as described in the present disclosure including with reference to FIGS. 1-3 and 4A.

In the example of FIG. 4B, the network entity and the UE may support a framework for associating energy saving modes of the network entity (for example, network energy saving modes) with BWPs. For example, the network may configure the UE (for example, using control signaling, such a RRC signaling) with a sequence of operation modes of the network entity (for example, network operation modes) associated with a BWP 405-*c* (for example, a sequence 430-*c* including a first energy saving mode 410, a flexible operation mode 415, and a second energy saving mode 420). Additionally or alternatively, the network entity may configure the UE with a sequence of network operation modes associated with a BWP 405-*d* (for example, a sequence 430-*d* including a default operation mode 425, the flexible operation mode 415, and the second energy saving mode 420). In some examples, the network entity may configure the UE to transition (for example, switch) between BWPs (for example, between the BWP 405-*c* and the BWP 405-*d* or one or more other BWPs) in accordance with the framework.

For example, the UE may receive an indication (for example, dynamically, such as using a DCI) to switch to a BWP associated with a particular network operation mode (for example, an energy saving mode). In such an example, the UE may switch operations to (for example, may communicate according to) a network operation mode associated with the BWP that the UE switched to. In some examples, the indicated BWP may be associated with a sequence of network operation modes. For example, the network entity may configure the UE with multiple sequences of network operation modes that may each be associated with one or more BWPs (for example, including the indicated BWP). Additionally or alternatively, the network entity may configure the sequences of network operation modes, such that the sequences of network operation modes may begin at a same time. In some examples, such as in response to receiving the indication to switch BWPs, the UE may operate in accordance with a network operation mode determined based on a time at which the UE switches BWPs.

As illustrated in the example of FIG. 4B, the network entity may configure the sequence 430-*c* of the BWP 405-*c* and the sequence 430-*d* of the BWP 405-*d* to begin at a same time. For example, the network entity may configure the UE with multiple sequence of network operation modes (for example, including the sequence 430-*c* and the sequence 430-*d*) that may overlap in time. For example, the multiple sequences of network operation modes may operate concurrently. In some examples, the network entity may configure the multiple sequences with multiple periodicities (for example, different periodicities). In such examples, portions of the multiple sequences may overlap in time (for example, relative to a time at which the multiple sequences begin). That is, the multiple sequences may be partially overlapping in the time domain and respective portions of the multiple sequences that are overlapping may be based on a respective periodicity of the multiple sequences. In some examples, such as examples in which the UE receives an indication to switch BWPs (for example, from the BWP 405-*c* to the BWP 405-*d*), the UE may determine (for example, assume) to switch network operation modes according to a time at which the UE switches BWPs (for example, according to a switching time 435-*b*). For example, a beginning of the sequence 430-*c* may overlap in the time domain with a beginning of the sequence 430-*d* and the UE may switch network operation modes (for example, in response to receiving an indication to switch BWPs, in response to switching BWPs) based on a temporal position of the sequence 430-*d* at the time at which the UE switches from using the BWP 405-*c* to the BWP 405-*d* (for example, at the switching time 435-*b*). That is, the UE may determine to switch network operation modes from the flexible operation mode 415 of the sequence 430-*c* to the flexible operation mode 415 of the sequence 430-*d* based on a temporal position of the sequence 430-*d* relative to a duration associated with the flexible operation mode 415 of the sequence 430-*d* at the switching time 435-*b*. In some examples, configuring the sequence 430-*c* to begin at a same time as the sequence 430-*d* may increase the efficiency of communication between the network entity and the UE, among other possible benefits.

Figure 5:
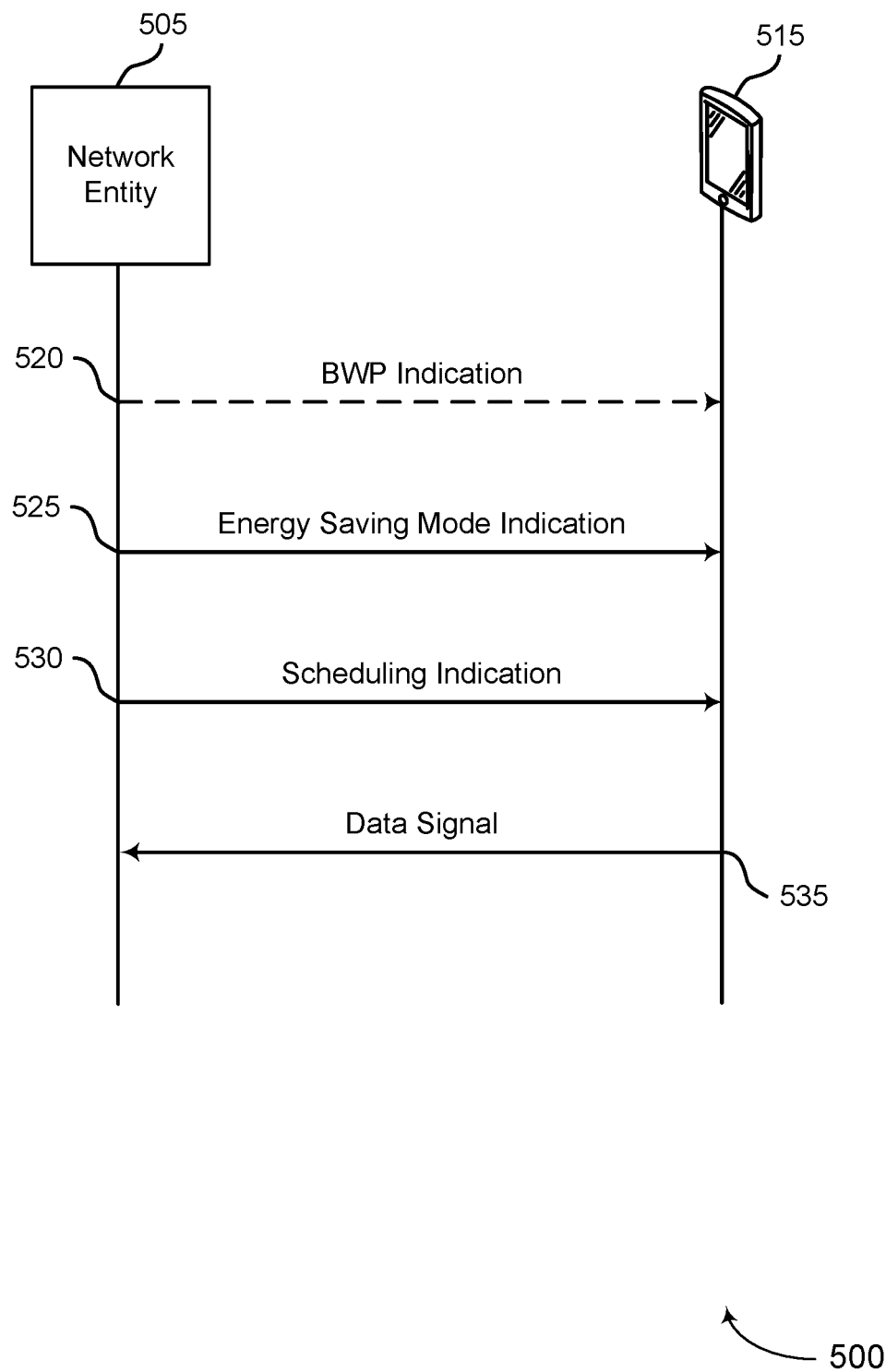
FIG. 5 illustrates an example of a process flow that supports BWP-specific network operation modes in accordance with one or more aspects of the present disclosure.

FIG. 5 illustrates an example of a process flow 500 that supports BWP-specific network operation modes in accordance with one or more aspects of the present disclosure. For example, the process flow 500 may be implemented by a network entity 505 or a UE 515, which may be examples of the corresponding devices described with reference to FIGS. 1-3, 4A, and 4B. In some examples, the network entity 505 and the UE 515 may implement the process flow 500 to promote network efficiencies by supporting a framework for associating sequences of network operation modes with BWPs. The process flow 500 may also be implemented by the network entity 505 and the UE 515 to promote high reliability and low latency operations, among other benefits. In the following description of the process flow 500, the operations between the UE 515 and the network entity 505 may be transmitted in a different order than the example order shown, or the operations performed by the UE 515 and the network entity 505 may be performed in different orders or at different times. Some operations may also be omitted.

As illustrated in the example of FIG. 5, a communication device (for example, the UE 515, the network entity 505) may support a framework for associating energy saving modes of the network entity 505 with BWPs. For example, at 525, the UE 515 may receive first control signaling including an energy saving mode indication, which may be an example of an energy saving mode indication as described in the present disclosure including with reference to FIGS. 1 and 2. For example, the energy saving mode indication may identify one or more operation modes of the network entity 505 (for example, one or more of one or more network operation modes that may include one or more energy saving modes, one or more default operation modes, or one or more flexible operation modes), one or more respective BWPs associated with each of the one or more energy saving modes (or one or more other network operation modes), and one or more respective durations over which each of the one or more energy saving modes (or the one or more other network operation modes) may be used at the network entity 505.

In some examples, at 520, the UE 515 may receive third control signaling including a BWP indication that identifies at least one BWP associated with a default operation mode of the network entity 505. The default operation mode may be an example of a default operation mode as described in the present disclosure, including with reference to FIGS. 2, 3, 4A, and 4B. For example, the default operation mode may correspond to non-energy saving operations (for example, normal network operation at the network entity 505). In some examples, receiving the first control signaling including the energy saving mode indication (for example, at 525) may be based on receiving the third control signaling.

At 530, the UE 515 may receive second control signaling including a scheduling indication, which may be an example of a scheduling indication as described in the present disclosure including with reference to FIGS. 1 and 2. For example, the scheduling indication may schedule a data signal to be communicated between the UE 515 and the network entity 505 over a duration of the one or more respective durations over which an energy saving mode of the one or more energy saving modes may be used at the network entity 505.

In some examples, in response to receiving the scheduling indication at 530, the UE 515 may communicate the data signal over the duration in accordance with the energy saving mode and using a BWP of the one or more respective BWPs associated with the energy saving mode. For example, at 535, the UE 515 may transmit the data signal to the network entity 505 using the BWP and in accordance with the energy saving mode.

In some examples, the network entity 505 may configure each BWP (for example, using the energy saving mode indication transmitted at 525) with a single (for example, a fixed) network energy saving operation. For example, a first BWP may operate according to (for example, under) a first energy saving mode, a second BWP may operate according to a default operation mode, and a third BWP may operate according to a flexible operation mode. In such an example, the UE 515 may switch an active BWP (for example, a BWP activated at the UE 515 for communication with the network entity 505) based on an indicated energy saving mode. In some examples, an active BWP (for example, current active BWP) may correspond to the second BWP (for example, a BWP associated with the default operation mode). Additionally or alternatively, the network entity 505 may indicate, to the UE 515, that the network entity 505 is to perform operations according to the first energy saving mode. In such examples, the UE 515 may switch (for example, transition) from the second BWP to the first BWP. That is, the UE 515 may receive control signaling including an indication of the energy saving mode and may communicate the data signal (for example, may transmit the data signal at 535) using the BWP associated with the indicated energy saving mode (for example, based on receiving the indication).

In some examples, the network entity 505 may configure more than one BWP (for example, using the energy saving mode indication transmitted at 525) with a same network operation mode (for example, a same network power saving mode, a same energy saving mode). Additionally or alternatively, the network entity 505 may switch to the network operation mode. In such examples, the UE 515 may switch to a reference BWP associated with the network operation mode. In some examples, the reference BWP may correspond to a BWP with a relatively small identifier (for example, a smallest BWP identifier of multiple BWP identifiers associated with the multiple BWPs) or a relatively a large identifier (for example, a largest BWP identifier of the multiple BWP identifiers associated with the multiple BWPs). Additionally or alternatively, the UE 515 may determine the reference BWP based on a respective size of the multiple BWPs. For example, the reference BWP may correspond to a BWP of the multiple BWPs with a relatively small frequency range or a relatively large frequency range (for example, a smallest frequency range or a largest frequency range of multiple frequency ranges associated with the multiple BWPs). In some examples, indicating, to the UE 515, one or more energy saving modes of the network entity 505, one or more respective BWPs associated with each of the one or more energy saving modes, and one or more respective durations over which each of the one or more energy saving modes may be used at the network entity 505 may improve communication reliability between the UE 515 and the network entity 505, among other possible benefits.

Figure 6:
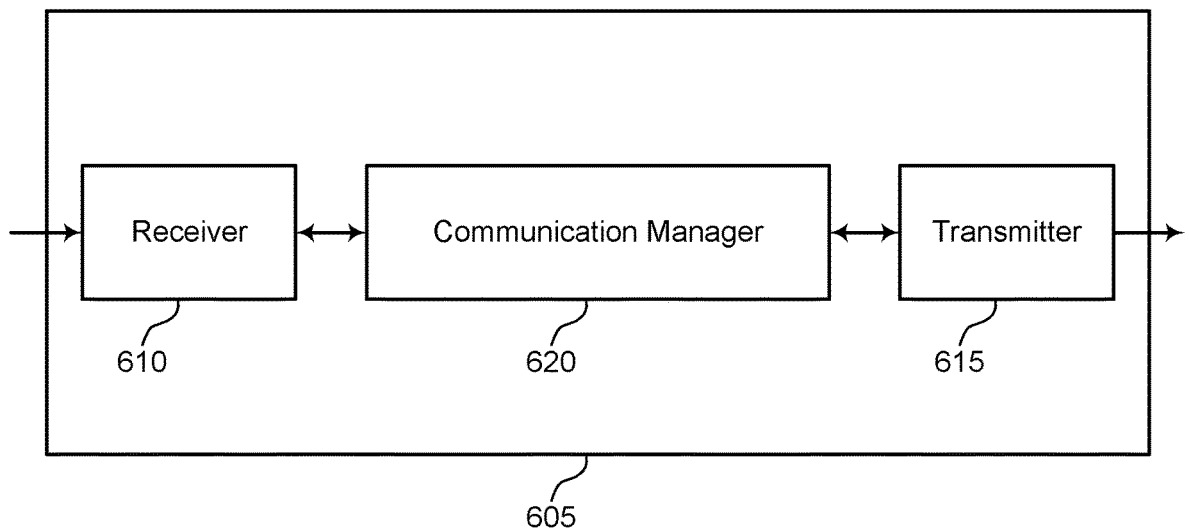
FIGS. 6 and 7 show block diagrams of devices that support BWP-specific network operation modes in accordance with one or more aspects of the present disclosure.

FIG. 6 shows a device 605 that supports BWP-specific network operation modes in accordance with one or more aspects of the present disclosure. The device 605 may be an example of aspects of a UE 115 as described herein. The device 605 may include a receiver 610, a transmitter 615, and a communication manager 620. The communication manager 620 can be implemented, at least in part, by one or both of a modem and a processor. Each of these components may be in communication with one another (for example, via one or more buses).

The receiver 610 may provide a means for receiving information such as one or more of packets, user data, or control information, associated with various information channels (for example, control channels, data channels, information channels related to BWP-specific network operation modes). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as one or more of packets, user data, or control information associated with various information channels (for example, control channels, data channels, information channels related to BWP-specific network operation modes). In some examples, the transmitter 615 may be co-located with a receiver 610 in a transceiver component. The transmitter 615 may utilize a single antenna or a set of multiple antennas.

The communication manager 620, the receiver 610, the transmitter 615, or various combinations thereof or various components thereof may be examples of means for performing various aspects of BWP-specific network operation modes as described herein. For example, the communication manager 620, the receiver 610, the transmitter 615, or various combinations or components thereof may support a method for performing one or more of the functions described herein.

In some examples, the communication manager 620 may be configured to perform various operations (for example, receiving, obtaining, monitoring, outputting, transmitting) using or otherwise in cooperation with the receiver 610, the transmitter 615, or both. For example, the communication manager 620 may receive information from the receiver 610, send information to the transmitter 615, or be integrated in combination with the receiver 610, the transmitter 615, or both to obtain information, output information, or perform various other operations as described herein.

The communication manager 620 may support wireless communication at a UE (for example, the device 605) in accordance with examples as disclosed herein. For example, the communication manager 620 may be configured as or otherwise support a means for receiving first control signaling including an energy saving mode indication that identifies: one or more energy saving modes of a network entity, one or more respective BWPs associated with each of the one or more energy saving modes, and one or more respective durations over which each of the one or more energy saving modes is to be used at the network entity. The communication manager 620 may be configured as or otherwise support a means for receiving second control signaling scheduling a data signal to be communicated between the UE and the network entity over a duration of the one or more respective durations over which an energy saving mode of the one or more energy saving modes is to be used at the network entity. The communication manager 620 may be configured as or otherwise support a means for communicating the data signal over the duration in accordance with the energy saving mode and using a BWP of the one or more respective BWPs associated with the energy saving mode.

By including or configuring the communication manager 620 in accordance with examples as described herein, the device 605 (for example, a processor controlling or otherwise coupled with one or more of the receiver 610, the transmitter 615, or the communication manager 620) may support techniques for more efficient utilization of communication resources.

Figure 7:
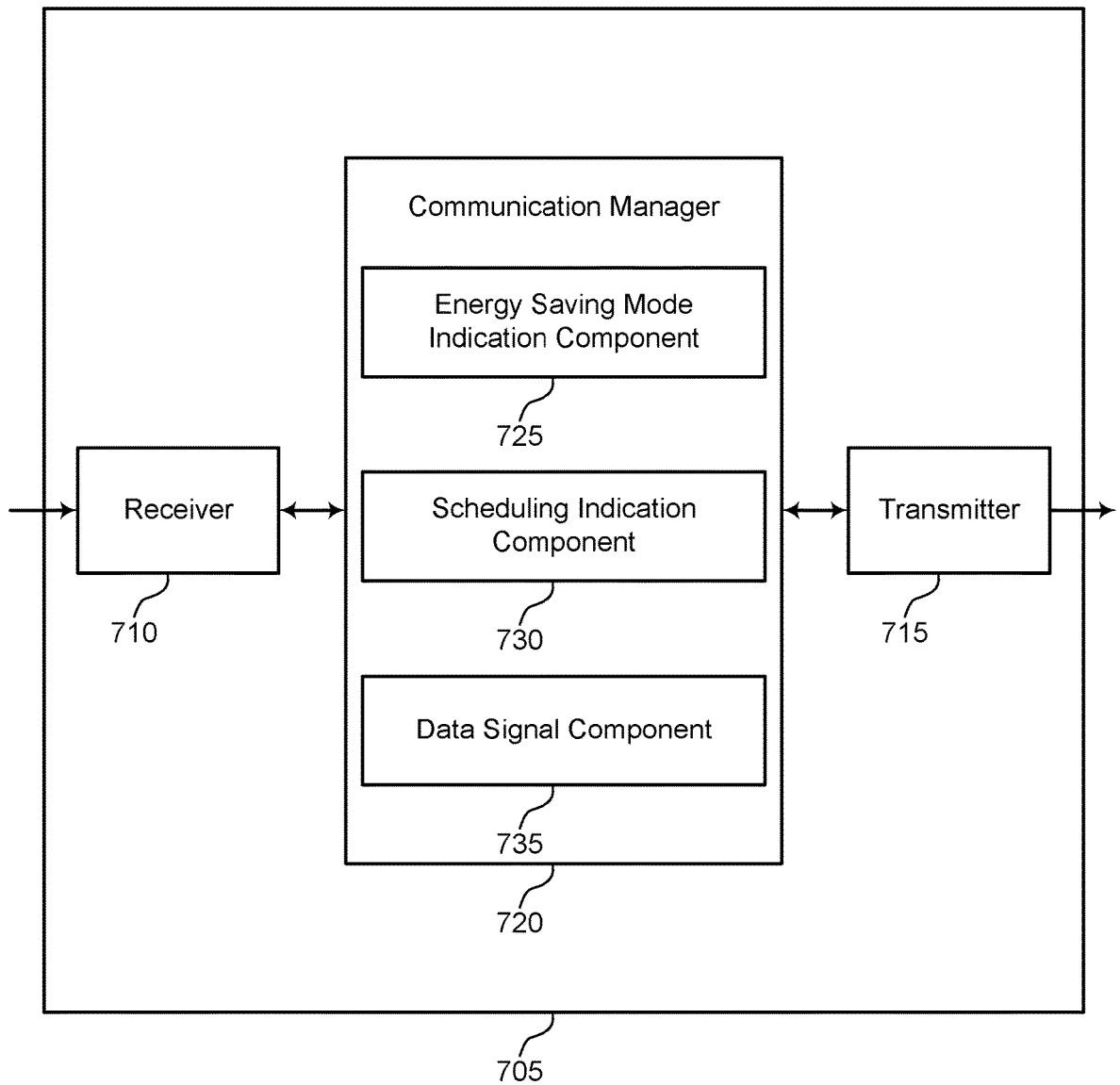

FIG. 7 shows a device 705 that supports BWP-specific network operation modes in accordance with one or more aspects of the present disclosure. The device 705 may be an example of aspects of a device 605 or a UE 115 as described herein. The device 705 may include a receiver 710, a transmitter 715, and a communication manager 720. The communication manager 720 can be implemented, at least in part, by one or both of a modem and a processor. Each of these components may be in communication with one another (for example, via one or more buses).

The receiver 710 may provide a means for receiving information such as one or more of packets, user data, or control information associated with various information channels (for example, control channels, data channels, information channels related to BWP-specific network operation modes). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as one or more of packets, user data, or control information associated with various information channels (for example, control channels, data channels, information channels related to BWP-specific network operation modes). In some examples, the transmitter 715 may be co-located with a receiver 710 in a transceiver component. The transmitter 715 may utilize a single antenna or a set of multiple antennas.

The device 705, or various components thereof, may be an example of means for performing various aspects of BWP-specific network operation modes as described herein. For example, the communication manager 720 may include one or more of an energy saving mode indication component 725, a scheduling indication component 730, or a data signal component 735. In some examples, the communication manager 720, or various components thereof, may be configured to perform various operations (for example, receiving, obtaining, monitoring, outputting, transmitting) using or otherwise in cooperation with the receiver 710, the transmitter 715, or both. For example, the communication manager 720 may receive information from the receiver 710, send information to the transmitter 715, or be integrated in combination with the receiver 710, the transmitter 715, or both to obtain information, output information, or perform various other operations as described herein.

The communication manager 720 may support wireless communication at a UE (for example, the device 705) in accordance with examples as disclosed herein. The energy saving mode indication component 725 may be configured as or otherwise support a means for receiving first control signaling including an energy saving mode indication that identifies: one or more energy saving modes of a network entity, one or more respective BWPs associated with each of the one or more energy saving modes, and one or more respective durations over which each of the one or more energy saving modes is to be used at the network entity. The scheduling indication component 730 may be configured as or otherwise support a means for receiving second control signaling scheduling a data signal to be communicated between the UE and the network entity over a duration of the one or more respective durations over which an energy saving mode of the one or more energy saving modes is to be used at the network entity. The data signal component 735 may be configured as or otherwise support a means for communicating the data signal over the duration in accordance with the energy saving mode and using a BWP of the one or more respective BWPs associated with the energy saving mode.

Figure 8:
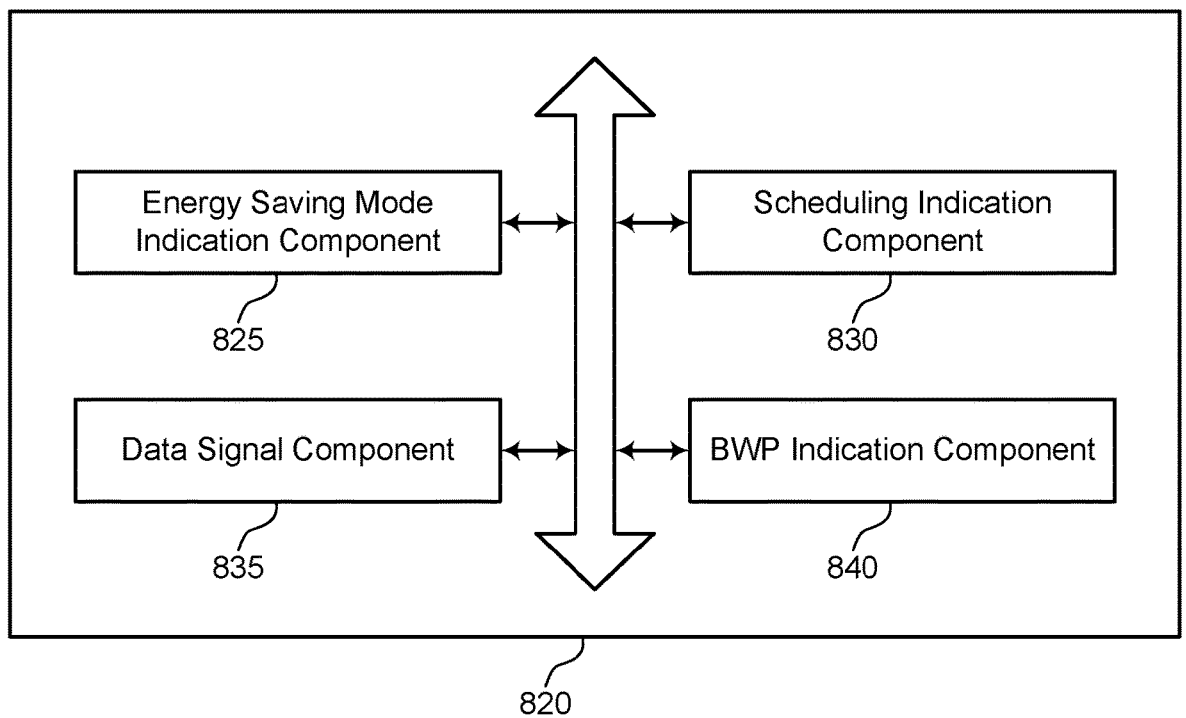
FIG. 8 shows a block diagram of a communication manager that supports BWP-specific network operation modes in accordance with one or more aspects of the present disclosure.

FIG. 8 shows a communication manager 820 that supports BWP-specific network operation modes in accordance with one or more aspects of the present disclosure. The communication manager 820, or various components thereof, may be an example of means for performing various aspects of BWP-specific network operation modes as described herein. For example, the communication manager 820 may include one or more of an energy saving mode indication component 825, a scheduling indication component 830, a data signal component 835, or a BWP indication component 840. Each of these components may communicate, directly or indirectly, with one another (for example, via one or more buses).

The communication manager 820 may support wireless communication at a UE in accordance with examples as disclosed herein. The energy saving mode indication component 825 may be configured as or otherwise support a means for receiving first control signaling including an energy saving mode indication that identifies: one or more energy saving modes of a network entity, one or more respective BWPs associated with each of the one or more energy saving modes, and one or more respective durations over which each of the one or more energy saving modes is to be used at the network entity. The scheduling indication component 830 may be configured as or otherwise support a means for receiving second control signaling scheduling a data signal to be communicated between the UE and the network entity over a duration of the one or more respective durations over which an energy saving mode of the one or more energy saving modes is to be used at the network entity. The data signal component 835 may be configured as or otherwise support a means for communicating the data signal over the duration in accordance with the energy saving mode and using a BWP of the one or more respective BWPs associated with the energy saving mode.

In some examples, the scheduling indication component 830 may be configured as or otherwise support a means for receiving third control signaling scheduling a second data signal to be communicated between the UE and the network entity using a second BWP. In some examples, the data signal component 835 may be configured as or otherwise support a means for communicating, in response to receiving the third control signaling, the second data signal using the second BWP in accordance with a default operation mode of the network entity based on the second BWP being unidentified in the energy saving mode indication.

In some examples, the BWP indication component 840 may be configured as or otherwise support a means for receiving third control signaling including an indication that identifies at least one BWP associated with a default operation mode of the network entity.

In some examples, at least one BWP associated with the default operation mode of the network entity includes an initial access BWP. In some examples, the energy saving mode indication identifies a respective range of frequencies included in each of the one or more respective BWPs associated with each of the one or more energy saving modes.

In some examples, the duration overlaps with a second duration associated with a second energy saving mode, the second energy saving mode being of a same energy saving mode type as the energy saving mode associated with the duration. In some examples, the BWP overlaps with a second BWP associated with a second energy saving mode, the second energy saving mode being of a same energy saving mode type as the energy saving mode associated with the BWP.

In some examples, the BWP indication component 840 may be configured as or otherwise support a means for receiving third control signaling including an indication for the UE to transition from using a second BWP to the BWP for communication with the network entity, where communicating the data signal in accordance with the energy saving mode is based on a time at which the UE transitions from using the second BWP to the BWP.

In some examples, the energy saving mode is included in a sequence of energy saving modes associated with the BWP, and the time at which the UE transitions from using the second BWP to the BWP corresponds to a beginning of the duration associated with the energy saving mode and a beginning of the sequence of energy saving modes.

In some examples, the energy saving mode is included in a sequence of energy saving modes associated with the BWP, a beginning of the sequence of energy saving modes overlaps in time with a beginning of a second sequence of energy saving modes associated with the second BWP, and communicating the data signal in accordance with the energy saving mode is based on a temporal position of the sequence of energy saving modes relative to the duration at the time at which the UE transitions from using the second BWP to the BWP.

In some examples, the energy saving mode indication component 825 may be configured as or otherwise support a means for receiving third control signaling including an indication of the energy saving mode, where communicating the data signal using the BWP in accordance with the energy saving mode is based on the third control signaling.

In some examples, the energy saving mode is associated with a set of multiple BWPs including the BWP. In some examples, communicating the data signal using the BWP in accordance with the energy saving mode is based on the BWP being associated with a smallest BWP identifier of a set of multiple BWP identifiers associated with the set of multiple BWPs. In some examples, the energy saving mode is associated with a set of multiple BWPs including the BWP. In some examples, communicating the data signal using the BWP in accordance with the energy saving mode is based on a size of the BWP.

Figure 9:
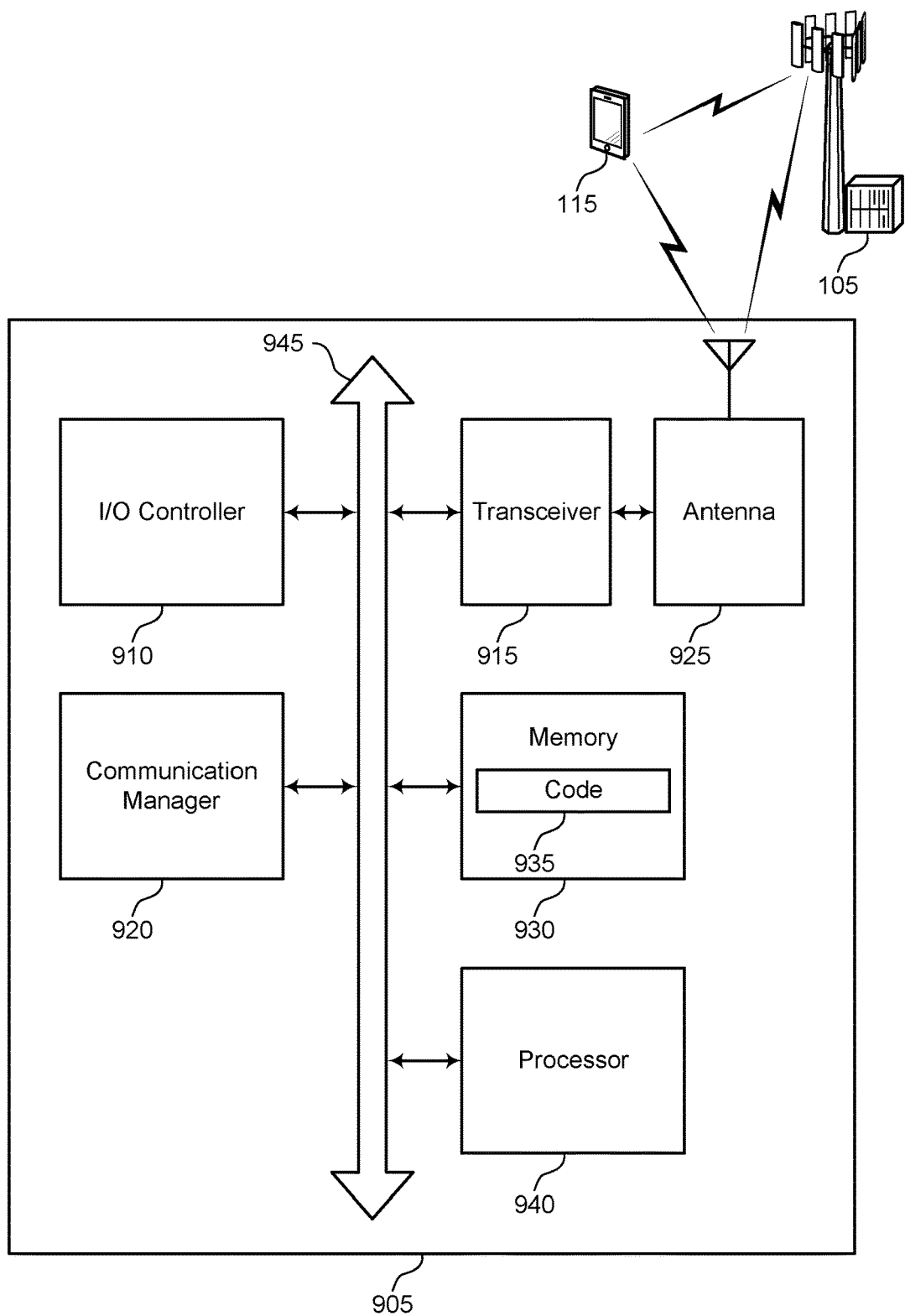
FIG. 9 shows a diagram of a system including a device that supports BWP-specific network operation modes in accordance with one or more aspects of the present disclosure.

FIG. 9 shows a diagram of a device 905 that supports BWP-specific network operation modes in accordance with one or more aspects of the present disclosure. The device 905 may be an example of or include the components of a device 605, a device 705, or a UE 115 as described herein. The device 905 may communicate (for example, wirelessly) with one or more of one or more network entities 105 or one or more UEs 115. The device 905 may include components for bi-directional voice and data communication including components for transmitting and receiving communication, such as a communication manager 920, an input/output (I/O) controller 910, a transceiver 915, an antenna 925, a memory 930, code 935, and a processor 940. These components may be in electronic communication or otherwise coupled (for example, operatively, communicatively, functionally, electronically, electrically) via one or more buses (for example, a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of one or more of a transmitter 615, a transmitter 715, a receiver 610, a receiver 710, or component thereof, as described herein.

The memory 930 may include random access memory (RAM) and read-only memory (ROM). The memory 930 may store computer-readable, computer-executable code 935 including instructions that, in some examples, such as examples in which the instructions may be executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (such as in examples in which the code may be compiled and executed) to perform functions described herein. In some cases, the memory 930 may contain, among other things, a basic I/O system (BIOS), which may control basic hardware or software operation such as the interaction with peripheral components or devices.

The processor 940 may include an intelligent hardware device (for example, one or more of a general-purpose processor, a DSP, a CPU, a microcontroller, an ASIC, an FPGA, a programmable logic device, a discrete gate or transistor logic component, or a discrete hardware component). In some cases, the processor 940 may be configured to operate a memory array using a memory controller. In some other cases, a memory controller may be integrated into the processor 940. The processor 940 may be configured to execute computer-readable instructions stored in a memory (for example, the memory 930) to cause the device 905 to perform various functions (for example, functions or tasks supporting BWP-specific network operation modes). For example, the device 905 or a component of the device 905 may include a processor 940 and memory 930 coupled with or to the processor 940, the processor 940 and memory 930 configured to perform various functions described herein.

The communication manager 920 may support wireless communication at a UE (for example, the device 905) in accordance with examples as disclosed herein. For example, the communication manager 920 may be configured as or otherwise support a means for receiving first control signaling including an energy saving mode indication that identifies: one or more energy saving modes of a network entity, one or more respective BWPs associated with each of the one or more energy saving modes, and one or more respective durations over which each of the one or more energy saving modes is to be used at the network entity. The communication manager 920 may be configured as or otherwise support a means for receiving second control signaling scheduling a data signal to be communicated between the UE and the network entity over a duration of the one or more respective durations over which an energy saving mode of the one or more energy saving modes is to be used at the network entity. The communication manager 920 may be configured as or otherwise support a means for communicating the data signal over the duration in accordance with the energy saving mode and using a BWP of the one or more respective BWPs associated with the energy saving mode.

By including or configuring the communication manager 920 in accordance with examples as described herein, the device 905 may support techniques for improved communication reliability, reduced latency, and more efficient utilization of communication resources.

In some examples, the communication manager 920 may be configured to perform various operations (for example, receiving, monitoring, transmitting) using or otherwise in cooperation with one or more of the transceiver 915 or the one or more antennas 925. Although the communication manager 920 is illustrated as a separate component, in some examples, one or more functions described with reference to the communication manager 920 may be supported by or performed by one or more of the processor 940, the memory 930, or the code 935. For example, the code 935 may include instructions executable by the processor 940 to cause the device 905 to perform various aspects of BWP-specific network operation modes as described herein, or the processor 940 and the memory 930 may be otherwise configured to perform or support such operations.

Figure 10:
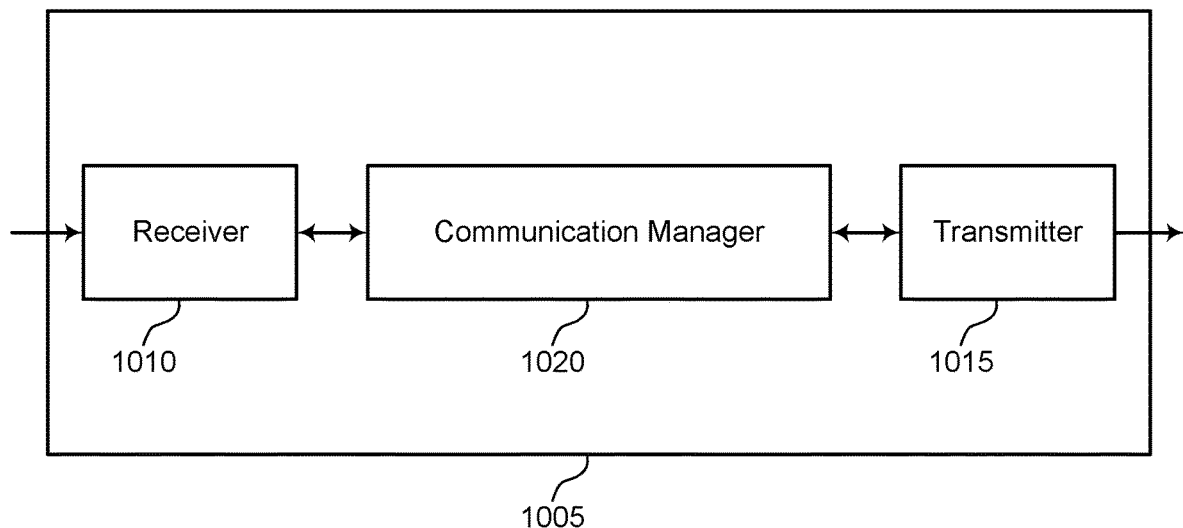
FIGS. 10 and 11 show block diagrams of devices that support BWP-specific network operation modes in accordance with one or more aspects of the present disclosure.

FIG. 10 shows a device 1005 that supports BWP-specific network operation modes in accordance with one or more aspects of the present disclosure. The device 1005 may be an example of aspects of a network entity 105 as described herein. The device 1005 may include a receiver 1010, a transmitter 1015, and a communication manager 1020. The communication manager 1020 can be implemented, at least in part, by one or both of a modem and a processor. Each of these components may be in communication with one another (for example, via one or more buses).

The receiver 1010 may provide a means for obtaining (for example, receiving, determining, identifying) information such as one or both of user data or control information (for example, I/Q samples, symbols, packets, protocol data units, service data units) associated with various channels (for example, control channels, data channels, information channels, channels associated with a protocol stack). Information may be passed on to other components of the device 1005. In some examples, the receiver 1010 may support obtaining information by receiving signals via one or more antennas. Additionally or alternatively, the receiver 1010 may support obtaining information by receiving signals via one or more of one or more wired (for example, electrical, fiber optic) interfaces, or wireless interfaces.

The transmitter 1015 may provide a means for outputting (for example, transmitting, providing, conveying, sending) information generated by other components of the device 1005. For example, the transmitter 1015 may output information such as one or both of user data or control information (for example, I/Q samples, symbols, packets, protocol data units, service data units) associated with various channels (for example, control channels, data channels, information channels, channels associated with a protocol stack). In some examples, the transmitter 1015 may support outputting information by transmitting signals via one or more antennas. Additionally or alternatively, the transmitter 1015 may support outputting information by transmitting signals via one or more of one or more wired (for example, electrical, fiber optic) interfaces, or wireless interfaces. In some examples, the transmitter 1015 and the receiver 1010 may be co-located in a transceiver, which may include or be coupled with a modem.

The communication manager 1020, the receiver 1010, the transmitter 1015, or various combinations thereof or various components thereof may be examples of means for performing various aspects of BWP-specific network operation modes as described herein. For example, the communication manager 1020, the receiver 1010, the transmitter 1015, or various combinations or components thereof may support a method for performing one or more of the functions described herein.

In some examples, the communication manager 1020 may be configured to perform various operations (for example, receiving, obtaining, monitoring, outputting, transmitting) using or otherwise in cooperation with the receiver 1010, the transmitter 1015, or both. For example, the communication manager 1020 may receive information from the receiver 1010, send information to the transmitter 1015, or be integrated in combination with the receiver 1010, the transmitter 1015, or both to obtain information, output information, or perform various other operations as described herein.

The communication manager 1020 may support wireless communication at a network entity (for example, the device 1005) in accordance with examples as disclosed herein. For example, the communication manager 1020 may be configured as or otherwise support a means for outputting first control signaling including an energy saving mode indication that identifies: one or more energy saving modes of the network entity, one or more respective BWPs associated with each of the one or more energy saving modes, and one or more respective durations over which each of the one or more energy saving modes is to be used at the network entity. The communication manager 1020 may be configured as or otherwise support a means for outputting second control signaling scheduling a data signal to be communicated between a UE and the network entity over a duration of the one or more respective durations over which an energy saving mode of the one or more energy saving modes is to be used at the network entity. The communication manager 1020 may be configured as or otherwise support a means for communicating the data signal: over the duration, in accordance with the energy saving mode, and using a BWP of the one or more respective BWPs associated with the energy saving mode.

By including or configuring the communication manager 1020 in accordance with examples as described herein, the device 1005 (for example, a processor controlling or otherwise coupled with one or more of the receiver 1010, the transmitter 1015, or the communication manager 1020) may support techniques for reduced power consumption and more efficient utilization of communication resources.

Figure 11:
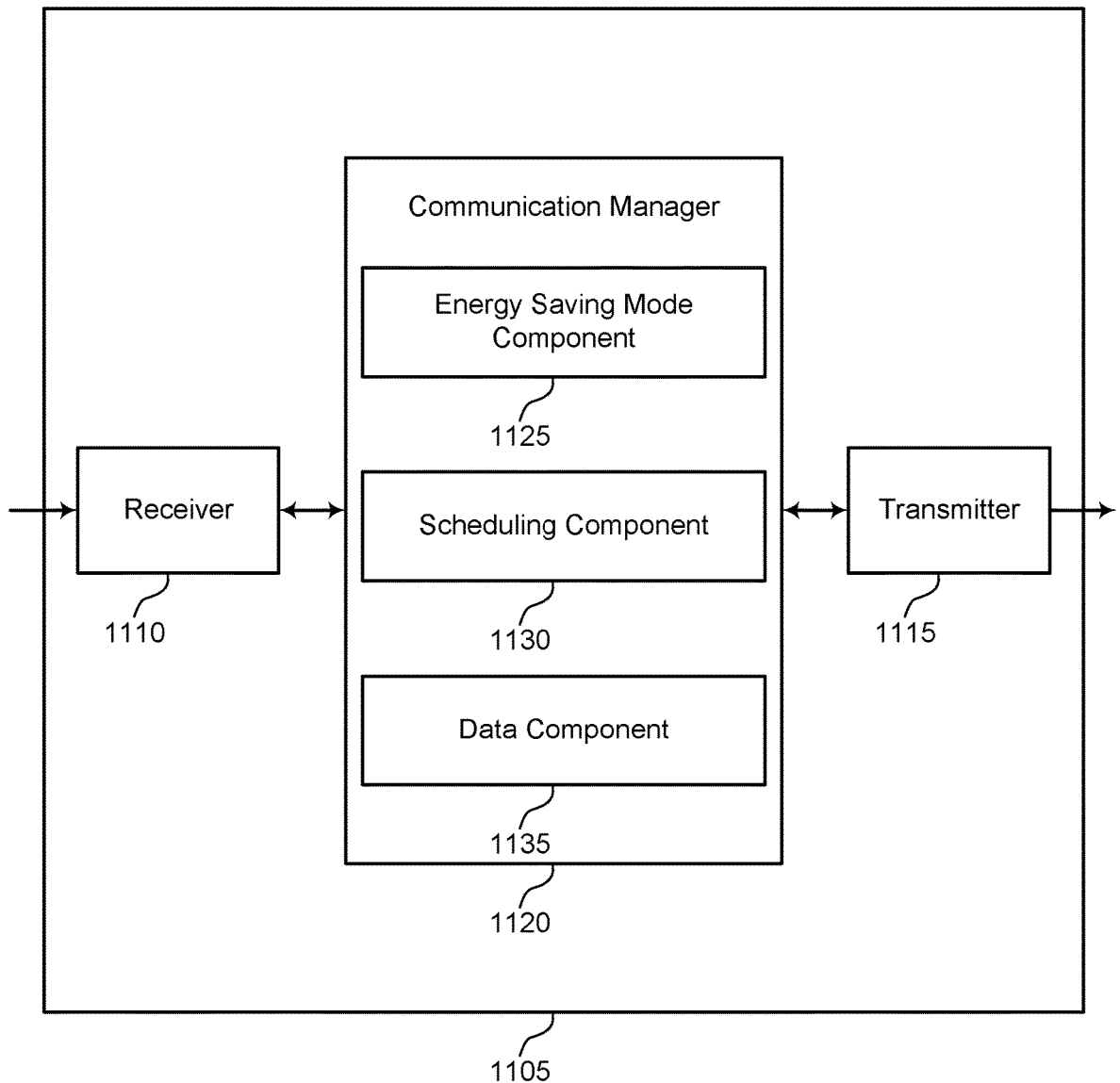

FIG. 11 shows a device 1105 that supports BWP-specific network operation modes in accordance with one or more aspects of the present disclosure. The device 1105 may be an example of aspects of a device 1005 or a network entity 105 as described herein. The device 1105 may include a receiver 1110, a transmitter 1115, and a communication manager 1120. The communication manager 1120 can be implemented, at least in part, by one or both of a modem and a processor. Each of these components may be in communication with one another (for example, via one or more buses).

The receiver 1110 may provide a means for obtaining (for example, receiving, determining, identifying) information such as one or both of user data or control information (for example, I/Q samples, symbols, packets, protocol data units, service data units) associated with various channels (for example, control channels, data channels, information channels, channels associated with a protocol stack). Information may be passed on to other components of the device 1105. In some examples, the receiver 1110 may support obtaining information by receiving signals via one or more antennas. Additionally or alternatively, the receiver 1110 may support obtaining information by receiving signals via one or more of one or more wired (for example, electrical, fiber optic) interfaces, or wireless interfaces.

The transmitter 1115 may provide a means for outputting (for example, transmitting, providing, conveying, sending) information generated by other components of the device 1105. For example, the transmitter 1115 may output information such as one or both of user data or control information (for example, I/Q samples, symbols, packets, protocol data units, service data units) associated with various channels (for example, control channels, data channels, information channels, channels associated with a protocol stack). In some examples, the transmitter 1115 may support outputting information by transmitting signals via one or more antennas. Additionally or alternatively, the transmitter 1115 may support outputting information by transmitting signals via one or more of one or more wired (for example, electrical, fiber optic) interfaces, or wireless interfaces. In some examples, the transmitter 1115 and the receiver 1110 may be co-located in a transceiver, which may include or be coupled with a modem.

The device 1105, or various components thereof, may be an example of means for performing various aspects of BWP-specific network operation modes as described herein. For example, the communication manager 1120 may include one or more of an energy saving mode component 1125, a scheduling component 1130, a data component 1135. In some examples, the communication manager 1120, or various components thereof, may be configured to perform various operations (for example, receiving, obtaining, monitoring, outputting, transmitting) using or otherwise in cooperation with the receiver 1110, the transmitter 1115, or both. For example, the communication manager 1120 may receive information from the receiver 1110, send information to the transmitter 1115, or be integrated in combination with the receiver 1110, the transmitter 1115, or both to obtain information, output information, or perform various other operations as described herein.

The communication manager 1120 may support wireless communication at a network entity (for example, the device 1105) in accordance with examples as disclosed herein. The energy saving mode component 1125 may be configured as or otherwise support a means for outputting first control signaling including an energy saving mode indication that identifies: one or more energy saving modes of the network entity, one or more respective BWPs associated with each of the one or more energy saving modes, and one or more respective durations over which each of the one or more energy saving modes is to be used at the network entity. The scheduling component 1130 may be configured as or otherwise support a means for outputting second control signaling scheduling a data signal to be communicated between a UE and the network entity over a duration of the one or more respective durations over which an energy saving mode of the one or more energy saving modes is to be used at the network entity. The data component 1135 may be configured as or otherwise support a means for communicating the data signal: over the duration, in accordance with the energy saving mode, and using a BWP of the one or more respective BWPs associated with the energy saving mode.

Figure 12:
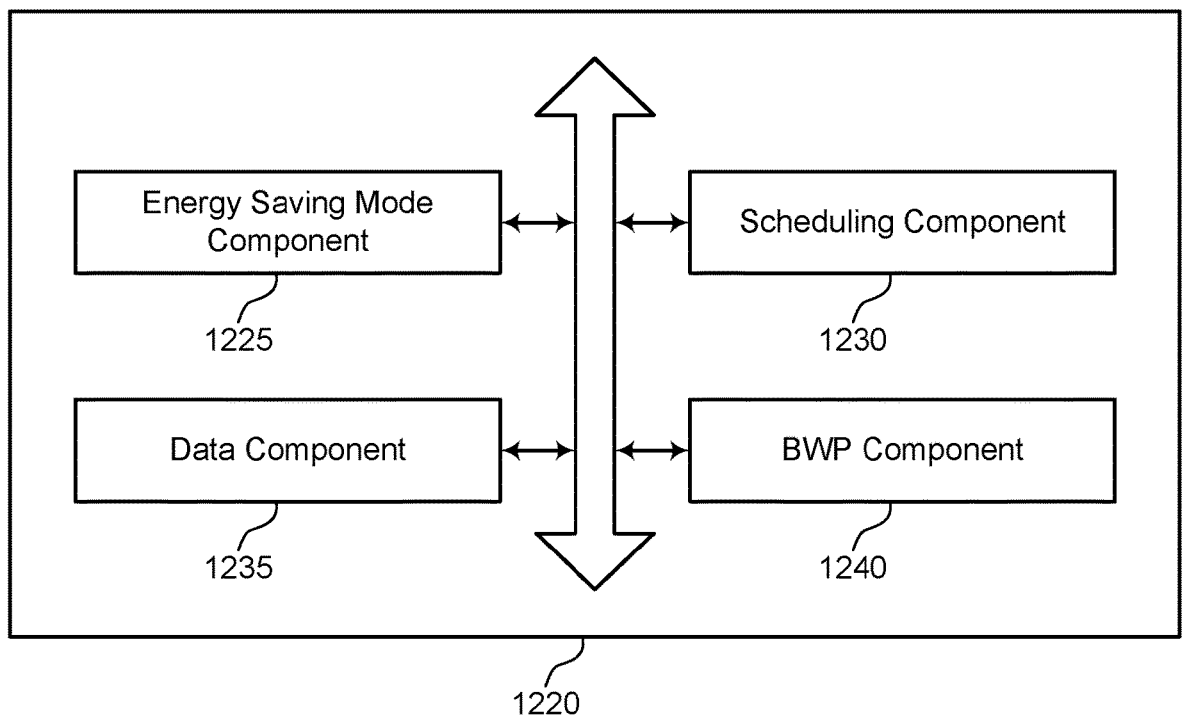
FIG. 12 shows a block diagram of a communication manager that supports BWP-specific network operation modes in accordance with one or more aspects of the present disclosure.

FIG. 12 shows a communication manager 1220 that supports BWP-specific network operation modes in accordance with one or more aspects of the present disclosure. The communication manager 1220, or various components thereof, may be an example of means for performing various aspects of BWP-specific network operation modes as described herein. For example, the communication manager 1220 may include one or more of an energy saving mode component 1225, a scheduling component 1230, a data component 1235, or a BWP component 1240. Each of these components may communicate, directly or indirectly, with one another (for example, via one or more buses), which may include one or both of communication within a protocol layer of a protocol stack or communication associated with a logical channel of a protocol stack (for example, between protocol layers of a protocol stack, within a device, component, or virtualized component associated with a network entity 105, between devices, components, or virtualized components associated with a network entity 105).

The communication manager 1220 may support wireless communication at a network entity in accordance with examples as disclosed herein. The energy saving mode component 1225 may be configured as or otherwise support a means for outputting first control signaling including an energy saving mode indication that identifies: one or more energy saving modes of the network entity, one or more respective BWPs associated with each of the one or more energy saving modes, and one or more respective durations over which each of the one or more energy saving modes is to be used at the network entity. The scheduling component 1230 may be configured as or otherwise support a means for outputting second control signaling scheduling a data signal to be communicated between a UE and the network entity over a duration of the one or more respective durations over which an energy saving mode of the one or more energy saving modes is to be used at the network entity. The data component 1235 may be configured as or otherwise support a means for communicating the data signal: over the duration, in accordance with the energy saving mode, and using a BWP of the one or more respective BWPs associated with the energy saving mode.

In some examples, the scheduling component 1230 may be configured as or otherwise support a means for outputting third control signaling scheduling a second data signal to be communicated between the UE and the network entity using a second BWP. In some examples, the data component 1235 may be configured as or otherwise support a means for communicating, in response to outputting the third control signaling, the second data signal using the second BWP in accordance with a default operation mode of the network entity based on the second BWP being unidentified in the energy saving mode indication.

In some examples, the BWP component 1240 may be configured as or otherwise support a means for outputting third control signaling including an indication that identifies at least one BWP associated with a default operation mode of the network entity.

In some examples, at least one BWP associated with the default operation mode of the network entity includes an initial access BWP. In some examples, the energy saving mode indication identifies a respective range of frequencies included in each of the one or more respective BWPs associated with each of the one or more energy saving modes.

In some examples, the duration overlaps with a second duration associated with a second energy saving mode, the second energy saving mode being of a same energy saving mode type as the energy saving mode associated with the duration. In some examples, the BWP overlaps with a second BWP associated with a second energy saving mode, the second energy saving mode being of a same energy saving mode type as the energy saving mode associated with the BWP.

In some examples, the BWP component 1240 may be configured as or otherwise support a means for outputting third control signaling including an indication for the UE to transition from using a second BWP to the BWP for communication with the network entity, where communicating the data signal in accordance with the energy saving mode is based on a time at which the UE is to transition from using the second BWP to the BWP.

In some examples, the energy saving mode is included in a sequence of energy saving modes associated with the BWP, and the time at which the UE is to transition from using the second BWP to the BWP corresponds to a beginning of the duration associated with the energy saving mode and a beginning of the sequence of energy saving modes.

In some examples, the energy saving mode is included in a sequence of energy saving modes associated with the BWP, a beginning of the sequence of energy saving modes overlaps in time with a beginning of a second sequence of energy saving modes associated with the second BWP, and communicating the data signal in accordance with the energy saving mode is based on a temporal position of the sequence of energy saving modes relative to the duration at the time at which the UE is to transition from using the second BWP to the BWP.

In some examples, the energy saving mode component 1225 may be configured as or otherwise support a means for outputting third control signaling including an indication of the energy saving mode, where communicating the data signal using the BWP in accordance with the energy saving mode is based on the third control signaling.

In some examples, the energy saving mode is associated with a set of multiple BWPs including the BWP. In some examples, communicating the data signal using the BWP in accordance with the energy saving mode is based on the BWP being associated with a smallest BWP identifier of a set of multiple BWP identifiers associated with the set of multiple BWPs. In some examples, the energy saving mode is associated with a set of multiple BWPs including the BWP. In some examples, communicating the data signal using the BWP in accordance with the energy saving mode is based on a size of the BWP.

Figure 13:
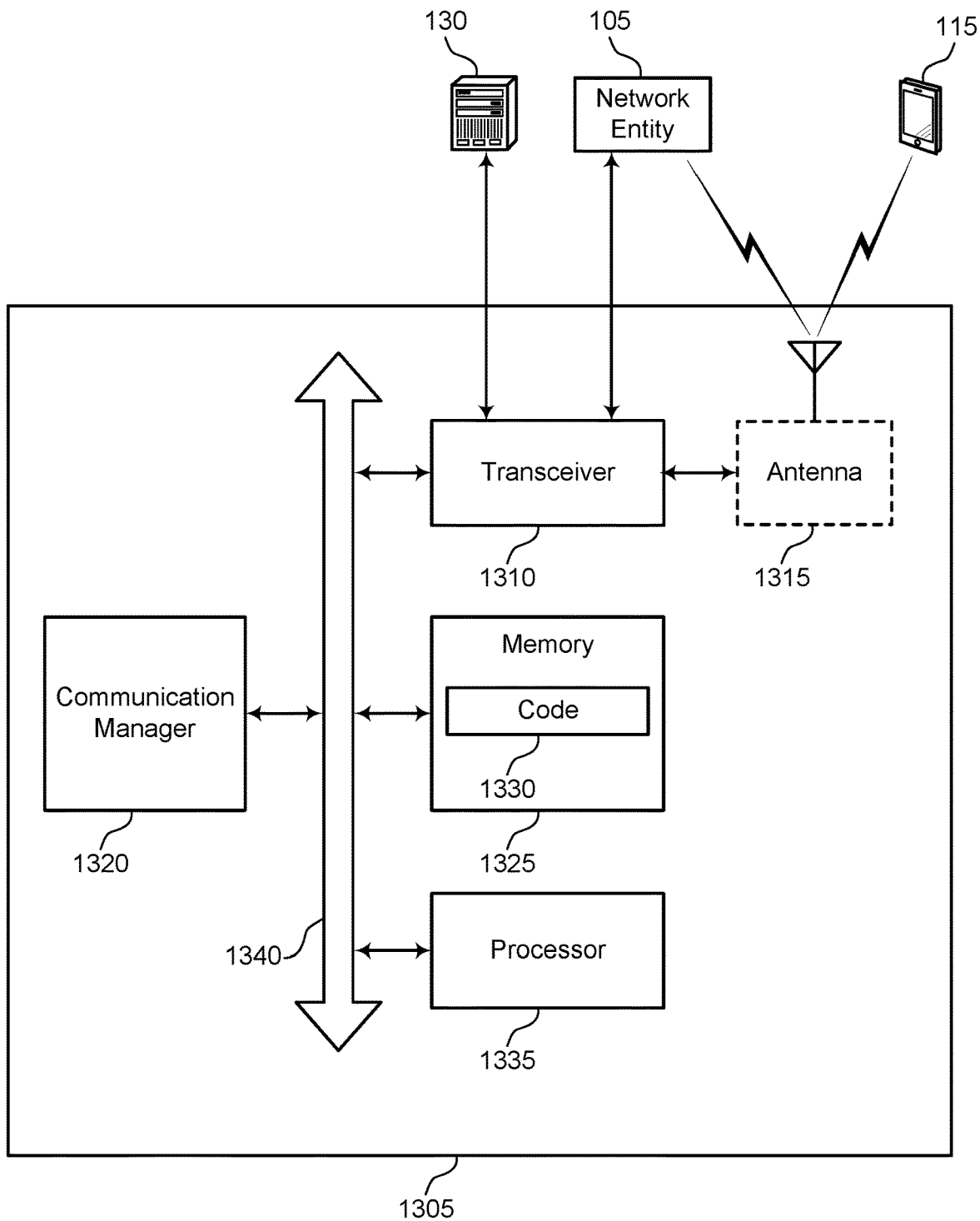
FIG. 13 shows a diagram of a system including a device that supports BWP-specific network operation modes in accordance with one or more aspects of the present disclosure.

FIG. 13 shows a diagram of a device 1305 that supports BWP-specific network operation modes in accordance with one or more aspects of the present disclosure. The device 1305 may be an example of or include the components of a device 1005, a device 1105, or a network entity 105 as described herein. The device 1305 may communicate with one or both of one or more network entities 105 or one or more UEs 115, which may include one or both of communication over one or more wired interfaces or communication over one or more wireless interfaces. The device 1305 may include components that support outputting and obtaining communication, such as a communication manager 1320, a transceiver 1310, an antenna 1315, a memory 1325, code 1330, and a processor 1335. These components may be in electronic communication or otherwise coupled (for example, operatively, communicatively, functionally, electronically, electrically) via one or more buses (for example, a bus 1340).

The transceiver 1310 may support bi-directional communication via wired links, wireless links, or both as described herein. In some examples, the transceiver 1310 may include a wired transceiver and may communicate bi-directionally with another wired transceiver. Additionally or alternatively, in some examples, the transceiver 1310 may include a wireless transceiver and may communicate bi-directionally with another wireless transceiver. In some examples, the device 1305 may include one or more antennas 1315, which may be capable of transmitting or receiving wireless transmissions (for example, concurrently). The transceiver 1310 may also include a modem to modulate signals, to provide the modulated signals for transmission (for example, by one or more antennas 1315, by a wired transmitter), to receive modulated signals (for example, from one or more antennas 1315, from a wired receiver), and to demodulate signals. In some implementations, the transceiver 1310 may include one or more interfaces, such as one or more interfaces coupled with the one or more antennas 1315 that are configured to support various receiving or obtaining operations, or one or more interfaces coupled with the one or more antennas 1315 that are configured to support one or both of various transmitting or various outputting operations. In some implementations, the transceiver 1310 may include or be configured for one or more of coupling with one or more processors or memory components that are operable to perform or support operations based on received or obtained information or signals, or to generate information or other signals for transmission or other outputting. In some implementations, the transceiver 1310, or the transceiver 1310 and the one or more antennas 1315, or the transceiver 1310 and the one or more antennas 1315 and one or more processors or memory components (for example, the processor 1335, or the memory 1325, or both), may be included in a chip or chip assembly that is installed in the device 1305. The transceiver 1310, or the transceiver 1310 and one or more antennas 1315 or wired interfaces, where applicable, may be an example of one or more of a transmitter 1015, a transmitter 1115, a receiver 1010, or a receiver 1110, as described herein. In some examples, the transceiver may be operable to support communication via one or more communication links (for example, a communication link 125, a backhaul communication link 120, a midhaul communication link 162, a fronthaul communication link 168).

The memory 1325 may include RAM and ROM. The memory 1325 may store computer-readable, computer-executable code 1330 including instructions that, in some examples, such as in examples in which the instructions may be executed by the processor 1335, cause the device 1305 to perform various functions described herein. The code 1330 may be stored in a non-transitory computer-readable medium such as system memory or another type of memory. In some cases, the code 1330 may not be directly executable by the processor 1335 but may cause a computer (such as in examples in which the code may be compiled and executed) to perform functions described herein. In some cases, the memory 1325 may contain, among other things, a BIOS, which may control basic hardware or software operation such as the interaction with peripheral components or devices.

The processor 1335 may include an intelligent hardware device (for example, one or more of a general-purpose processor, a DSP, an ASIC, a CPU, an FPGA, a microcontroller, a programmable logic device, discrete gate or transistor logic, or a discrete hardware component). In some cases, the processor 1335 may be configured to operate a memory array using a memory controller. In some other cases, a memory controller may be integrated into the processor 1335. The processor 1335 may be configured to execute computer-readable instructions stored in a memory (for example, the memory 1325) to cause the device 1305 to perform various functions (for example, functions or tasks supporting BWP-specific network operation modes). For example, the device 1305 or a component of the device 1305 may include a processor 1335 and memory 1325 coupled with the processor 1335, the processor 1335 and memory 1325 configured to perform various functions described herein. The processor 1335 may be an example of a cloud-computing platform (for example, one or more physical nodes and supporting software such as operating systems, virtual machines, or container instances) that may host the functions (for example, by executing code 1330) to perform the functions of the device 1305. The processor 1335 may be any one or more suitable processors capable of executing scripts or instructions of one or more software programs stored in the device 1305 (such as within the memory 1325). In some implementations, the processor 1335 may be a component of a processing system. A processing system may refer to a system or series of machines or components that receives inputs and processes the inputs to produce a set of outputs (which may be passed to other systems or components of, for example, the device 1305). For example, a processing system of the device 1305 may refer to a system including the various other components or subcomponents of the device 1305, such as the processor 1335, or the transceiver 1310, or the communication manager 1320, or other components or combinations of components of the device 1305. The processing system of the device 1305 may interface with other components of the device 1305, and may process information received from other components (such as inputs or signals) or output information to other components. For example, a chip or modem of the device 1305 may include a processing system and an interface to output information, or to obtain information, or both. The interface may be implemented as or otherwise include a first interface configured to output information and a second interface configured to obtain information. In some implementations, the first interface may refer to an interface between the processing system of the chip or modem and a transmitter, such that the device 1305 may transmit information output from the chip or modem. In some implementations, the second interface may refer to an interface between the processing system of the chip or modem and a receiver, such that the device 1305 may obtain information or signal inputs, and the information may be passed to the processing system. A person having ordinary skill in the art will readily recognize that the first interface also may obtain information or signal inputs, and the second interface also may output information or signal outputs.

In some examples, a bus 1340 may support communication of (for example, within) a protocol layer of a protocol stack. In some examples, a bus 1340 may support communication associated with a logical channel of a protocol stack (for example, between protocol layers of a protocol stack), which may include communication performed within a component of the device 1305, or between different components of the device 1305 that may be co-located or located in different locations (for example, where the device 1305 may refer to a system in which one or more of the communication manager 1320, the transceiver 1310, the memory 1325, the code 1330, and the processor 1335 may be located in one of the different components or divided between different components).

In some examples, the communication manager 1320 may manage aspects of communication with a core network 130 (for example, via one or more wired or wireless backhaul links). For example, the communication manager 1320 may manage the transfer of data communication for client devices, such as one or more UEs 115. In some examples, the communication manager 1320 may manage communication with other network entities 105, and may include a controller or scheduler for controlling communication with UEs 115 in cooperation with other network entities 105. In some examples, the communication manager 1320 may support an X2 interface within an LTE/LTE-A wireless communication network technology to provide communication between network entities 105.

The communication manager 1320 may support wireless communication at a network entity (for example, the device 1305) in accordance with examples as disclosed herein. For example, the communication manager 1320 may be configured as or otherwise support a means for outputting first control signaling including an energy saving mode indication that identifies: one or more energy saving modes of the network entity, one or more respective BWPs associated with each of the one or more energy saving modes, and one or more respective durations over which each of the one or more energy saving modes is to be used at the network entity. The communication manager 1320 may be configured as or otherwise support a means for outputting second control signaling scheduling a data signal to be communicated between a UE and the network entity over a duration of the one or more respective durations over which an energy saving mode of the one or more energy saving modes is to be used at the network entity. The communication manager 1320 may be configured as or otherwise support a means for communicating the data signal: over the duration, in accordance with the energy saving mode, and using a BWP of the one or more respective BWPs associated with the energy saving mode.

By including or configuring the communication manager 1320 in accordance with examples as described herein, the device 1305 may support techniques for improved communication reliability, reduced latency, reduced power consumption, and more efficient utilization of communication resources.

In some examples, the communication manager 1320 may be configured to perform various operations (for example, receiving, obtaining, monitoring, outputting, transmitting) using or otherwise in cooperation with one or more of the transceiver 1310 or the one or more antennas 1315 (for example, where applicable). Although the communication manager 1320 is illustrated as a separate component, in some examples, one or more functions described with reference to the communication manager 1320 may be supported by or performed by one or more of the processor 1335, the memory 1325, the code 1330, or the transceiver 1310. For example, the code 1330 may include instructions executable by the processor 1335 to cause the device 1305 to perform various aspects of BWP-specific network operation modes as described herein, or the processor 1335 and the memory 1325 may be otherwise configured to perform or support such operations.

Figure 14:
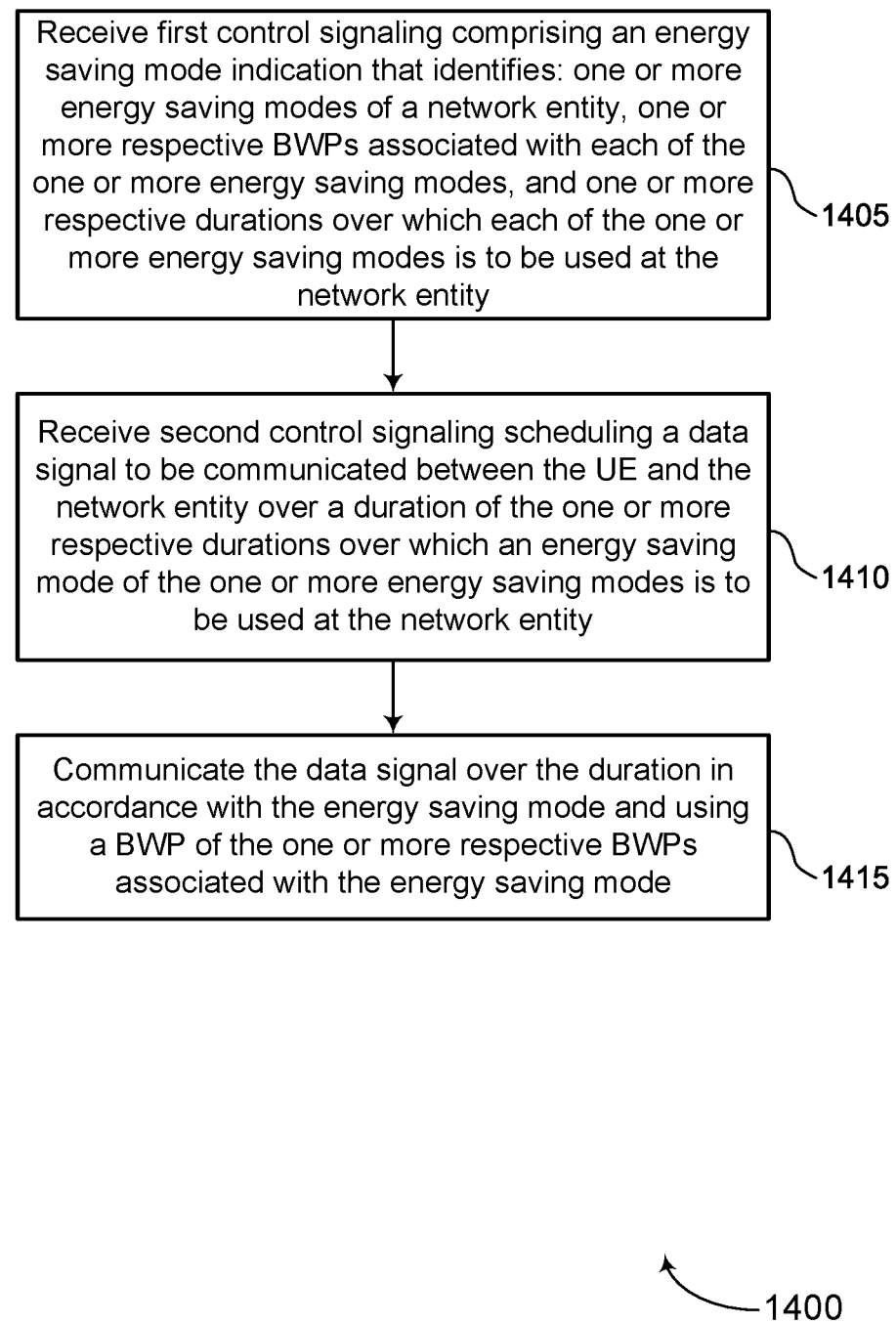
FIGS. 14 through 17 show flowcharts illustrating methods that support BWP-specific network operation modes in accordance with one or more aspects of the present disclosure.

FIG. 14 shows a flowchart illustrating a method 1400 that supports BWP-specific network operation modes in accordance with one or more aspects of the present disclosure. The operations of the method 1400 may be implemented at a UE or its components as described herein. For example, the operations of the method 1400 may be performed by a UE 115 as described with reference to FIGS. 1-9. In some examples, a UE may execute a set of instructions to control the functional elements of the UE to perform the described functions. Additionally or alternatively, the UE may perform aspects of the described functions using special-purpose hardware.

At 1405, the method may include receiving first control signaling including an energy saving mode indication that identifies: one or more energy saving modes of a network entity, one or more respective BWPs associated with each of the one or more energy saving modes, and one or more respective durations over which each of the one or more energy saving modes is to be used at the network entity. The operations of 1405 may be performed in accordance with examples as disclosed herein. In some examples, aspects of the operations of 1405 may be performed by an energy saving mode indication component 825 as described with reference to FIG. 8.

At 1410, the method may include receiving second control signaling scheduling a data signal to be communicated between the UE and the network entity over a duration of the one or more respective durations over which an energy saving mode of the one or more energy saving modes is to be used at the network entity. The operations of 1410 may be performed in accordance with examples as disclosed herein. In some examples, aspects of the operations of 1410 may be performed by a scheduling indication component 830 as described with reference to FIG. 8.

At 1415, the method may include communicating the data signal over the duration in accordance with the energy saving mode and using a BWP of the one or more respective BWPs associated with the energy saving mode. The operations of 1415 may be performed in accordance with examples as disclosed herein. In some examples, aspects of the operations of 1415 may be performed by a data signal component 835 as described with reference to FIG. 8.

Figure 15:
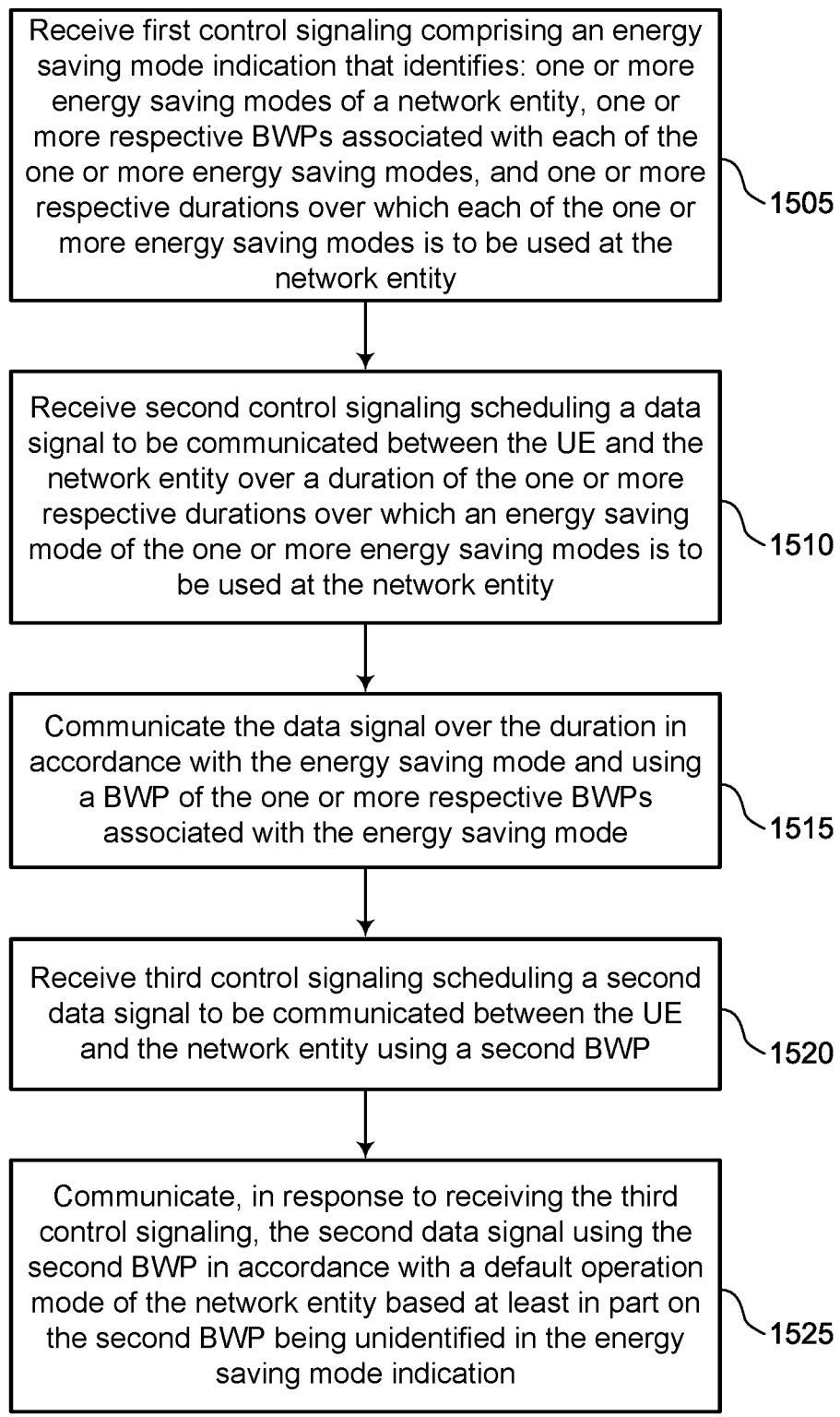

FIG. 15 shows a flowchart illustrating a method 1500 that supports BWP-specific network operation modes in accordance with one or more aspects of the present disclosure. The operations of the method 1500 may be implemented at a UE or its components as described herein. For example, the operations of the method 1500 may be performed by a UE 115 as described with reference to FIGS. 1-9. In some examples, a UE may execute a set of instructions to control the functional elements of the UE to perform the described functions. Additionally or alternatively, the UE may perform aspects of the described functions using special-purpose hardware.

At 1505, the method may include receiving first control signaling including an energy saving mode indication that identifies: one or more energy saving modes of a network entity, one or more respective BWPs associated with each of the one or more energy saving modes, and one or more respective durations over which each of the one or more energy saving modes is to be used at the network entity. The operations of 1505 may be performed in accordance with examples as disclosed herein. In some examples, aspects of the operations of 1505 may be performed by an energy saving mode indication component 825 as described with reference to FIG. 8.

At 1510, the method may include receiving second control signaling scheduling a data signal to be communicated between the UE and the network entity over a duration of the one or more respective durations over which an energy saving mode of the one or more energy saving modes is to be used at the network entity. The operations of 1510 may be performed in accordance with examples as disclosed herein. In some examples, aspects of the operations of 1510 may be performed by a scheduling indication component 830 as described with reference to FIG. 8.

At 1515, the method may include communicating the data signal over the duration in accordance with the energy saving mode and using a BWP of the one or more respective BWPs associated with the energy saving mode. The operations of 1515 may be performed in accordance with examples as disclosed herein. In some examples, aspects of the operations of 1515 may be performed by a data signal component 835 as described with reference to FIG. 8.

At 1520, the method may include receiving third control signaling scheduling a second data signal to be communicated between the UE and the network entity using a second BWP. The operations of 1520 may be performed in accordance with examples as disclosed herein. In some examples, aspects of the operations of 1520 may be performed by a scheduling indication component 830 as described with reference to FIG. 8.

At 1525, the method may include communicating, in response to receiving the third control signaling, the second data signal using the second BWP in accordance with a default operation mode of the network entity based on the second BWP being unidentified in the energy saving mode indication. The operations of 1525 may be performed in accordance with examples as disclosed herein. In some examples, aspects of the operations of 1525 may be performed by a data signal component 835 as described with reference to FIG. 8.

Figure 16:
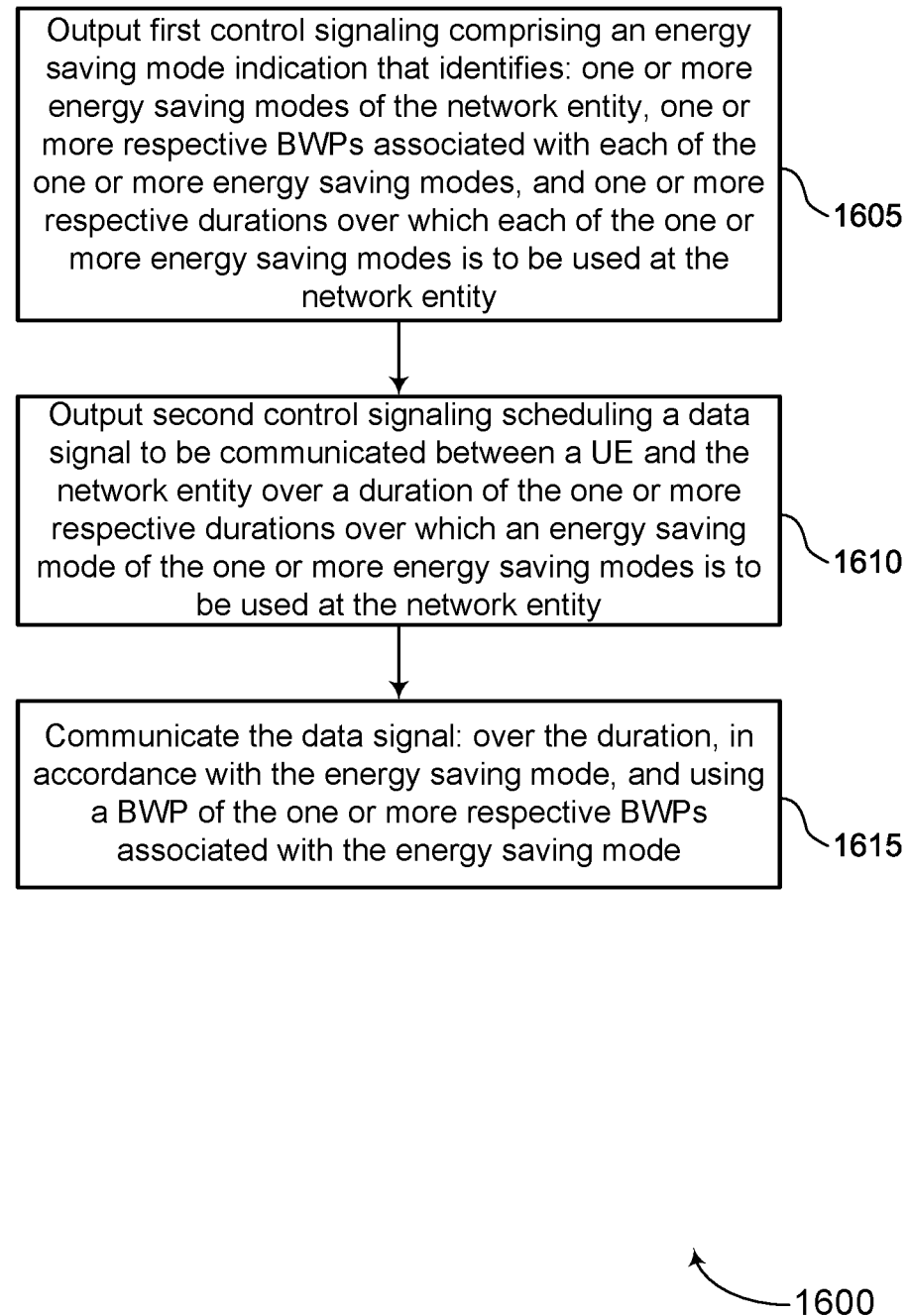

FIG. 16 shows a flowchart illustrating a method 1600 that supports BWP-specific network operation modes in accordance with one or more aspects of the present disclosure. The operations of the method 1600 may be implemented at a network entity or its components as described herein. For example, the operations of the method 1600 may be performed by a network entity as described with reference to FIGS. 1-5 and 10-13. In some examples, a network entity may execute a set of instructions to control the functional elements of the network entity to perform the described functions. Additionally or alternatively, the network entity may perform aspects of the described functions using special-purpose hardware.

At 1605, the method may include outputting first control signaling including an energy saving mode indication that identifies: one or more energy saving modes of the network entity, one or more respective BWPs associated with each of the one or more energy saving modes, and one or more respective durations over which each of the one or more energy saving modes is to be used at the network entity. The operations of 1605 may be performed in accordance with examples as disclosed herein. In some examples, aspects of the operations of 1605 may be performed by an energy saving mode component 1225 as described with reference to FIG. 12.

At 1610, the method may include outputting second control signaling scheduling a data signal to be communicated between a UE and the network entity over a duration of the one or more respective durations over which an energy saving mode of the one or more energy saving modes is to be used at the network entity. The operations of 1610 may be performed in accordance with examples as disclosed herein. In some examples, aspects of the operations of 1610 may be performed by a scheduling component 1230 as described with reference to FIG. 12.

At 1615, the method may include communicating the data signal: over the duration, in accordance with the energy saving mode, and using a BWP of the one or more respective BWPs associated with the energy saving mode. The operations of 1615 may be performed in accordance with examples as disclosed herein. In some examples, aspects of the operations of 1615 may be performed by a data component 1235 as described with reference to FIG. 12.

Figure 17:
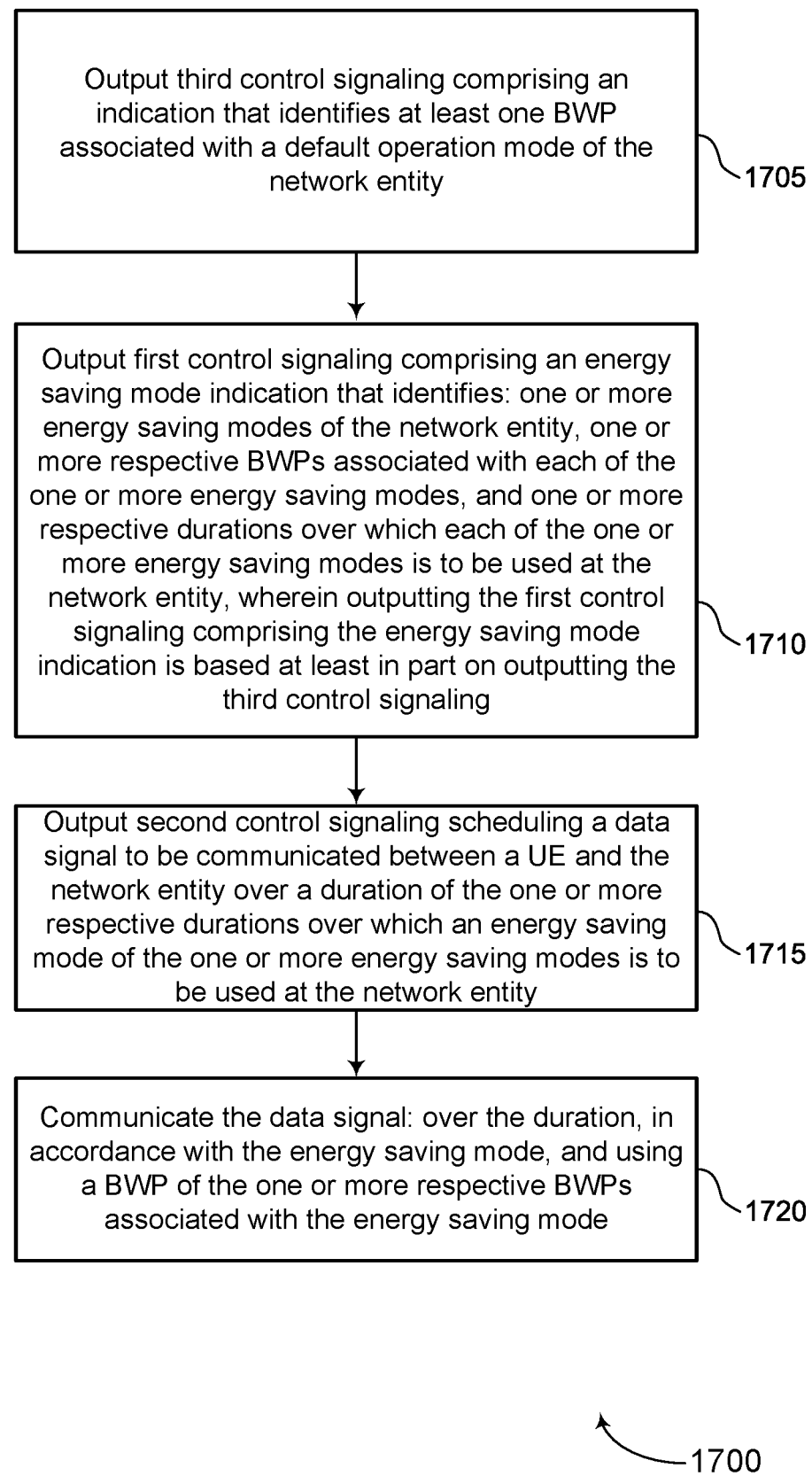

FIG. 17 shows a flowchart illustrating a method 1700 that supports BWP-specific network operation modes in accordance with one or more aspects of the present disclosure. The operations of the method 1700 may be implemented at a network entity or its components as described herein. For example, the operations of the method 1700 may be performed by a network entity as described with reference to FIGS. 1-5 and 10-13. In some examples, a network entity may execute a set of instructions to control the functional elements of the network entity to perform the described functions. Additionally or alternatively, the network entity may perform aspects of the described functions using special-purpose hardware.

At 1705, the method may include outputting third control signaling including an indication that identifies at least one BWP associated with a default operation mode of the network entity. The operations of 1705 may be performed in accordance with examples as disclosed herein. In some examples, aspects of the operations of 1705 may be performed by a BWP component 1240 as described with reference to FIG. 12.

At 1710, the method may include outputting first control signaling including an energy saving mode indication that identifies: one or more energy saving modes of the network entity, one or more respective BWPs associated with each of the one or more energy saving modes, and one or more respective durations over which each of the one or more energy saving modes is to be used at the network entity, where outputting the first control signaling including the energy saving mode indication is based on outputting the third control signaling. The operations of 1710 may be performed in accordance with examples as disclosed herein. In some examples, aspects of the operations of 1710 may be performed by an energy saving mode component 1225 as described with reference to FIG. 12.

At 1715, the method may include outputting second control signaling scheduling a data signal to be communicated between a UE and the network entity over a duration of the one or more respective durations over which an energy saving mode of the one or more energy saving modes is to be used at the network entity. The operations of 1715 may be performed in accordance with examples as disclosed herein. In some examples, aspects of the operations of 1715 may be performed by a scheduling component 1230 as described with reference to FIG. 12.

At 1720, the method may include communicating the data signal: over the duration, in accordance with the energy saving mode, and using a BWP of the one or more respective BWPs associated with the energy saving mode. The operations of 1720 may be performed in accordance with examples as disclosed herein. In some examples, aspects of the operations of 1720 may be performed by a data component 1235 as described with reference to FIG. 12.

The following provides an overview of aspects of the present disclosure:

Aspect 1: A method for wireless communication at a UE, comprising: receiving first control signaling comprising an energy saving mode indication that identifies: one or more energy saving modes of a network entity, one or more respective BWPs associated with each of the one or more energy saving modes, and one or more respective durations over which each of the one or more energy saving modes is to be used at the network entity; receiving second control signaling scheduling a data signal to be communicated between the UE and the network entity over a duration of the one or more respective durations over which an energy saving mode of the one or more energy saving modes is to be used at the network entity; and communicating the data signal over the duration in accordance with the energy saving mode and using a BWP of the one or more respective BWPs associated with the energy saving mode.

Aspect 2: The method of aspect 1, further comprising: receiving third control signaling scheduling a second data signal to be communicated between the UE and the network entity using a second BWP; and communicating, in response to receiving the third control signaling, the second data signal using the second BWP in accordance with a default operation mode of the network entity based at least in part on the second BWP being unidentified in the energy saving mode indication.

Aspect 3: The method of any of aspects 1 through 2, further comprising: receiving third control signaling comprising an indication that identifies at least one BWP associated with a default operation mode of the network entity.

Aspect 4: The method of aspect 3, wherein at least one BWP associated with the default operation mode of the network entity comprises an initial access BWP.

Aspect 5: The method of any of aspects 1 through 4, wherein the energy saving mode indication identifies a respective range of frequencies included in each of the one or more respective BWPs associated with each of the one or more energy saving modes.

Aspect 6: The method of any of aspects 1 through 5, wherein the duration overlaps with a second duration associated with a second energy saving mode, the second energy saving mode being of a same energy saving mode type as the energy saving mode associated with the duration.

Aspect 7: The method of any of aspects 1 through 6, wherein the BWP overlaps with a second BWP associated with a second energy saving mode, the second energy saving mode being of a same energy saving mode type as the energy saving mode associated with the BWP.

Aspect 8: The method of any of aspects 1 through 7, further comprising: receiving third control signaling comprising an indication for the UE to transition from using a second BWP to the BWP for communications with the network entity, wherein communicating the data signal in accordance with the energy saving mode is based at least in part on a time at which the UE transitions from using the second BWP to the BWP.

Aspect 9: The method of aspect 8, wherein the energy saving mode is included in a sequence of energy saving modes associated with the BWP, and the time at which the UE transitions from using the second BWP to the BWP corresponds to a beginning of the duration associated with the energy saving mode and a beginning of the sequence of energy saving modes.

Aspect 10: The method of aspect 8, wherein the energy saving mode is included in a sequence of energy saving modes associated with the BWP, a beginning of the sequence of energy saving modes overlaps in time with a beginning of a second sequence of energy saving modes associated with the second BWP, and communicating the data signal in accordance with the energy saving mode is based at least in part on a temporal position of the sequence of energy saving modes relative to the duration at the time at which the UE transitions from using the second BWP to the BWP.

Aspect 11: The method of any of aspects 1 through 10, further comprising: receiving third control signaling comprising an indication of the energy saving mode, wherein communicating the data signal using the BWP in accordance with the energy saving mode is based at least in part on the third control signaling.

Aspect 12: The method of aspect 11, wherein the energy saving mode is associated with a plurality of BWPs including the BWP, and communicating the data signal using the BWP in accordance with the energy saving mode is based at least in part on the BWP being associated with a smallest BWP identifier of a plurality of BWP identifiers associated with the plurality of BWPs.

Aspect 13: The method of aspect 11, wherein the energy saving mode is associated with a plurality of BWPs including the BWP, and communicating the data signal using the BWP in accordance with the energy saving mode is based at least in part on a size of the BWP.

Aspect 14: A method for wireless communication at a network entity, comprising: outputting first control signaling comprising an energy saving mode indication that identifies: one or more energy saving modes of the network entity, one or more respective BWPs associated with each of the one or more energy saving modes, and one or more respective durations over which each of the one or more energy saving modes is to be used at the network entity; outputting second control signaling scheduling a data signal to be communicated between a UE and the network entity over a duration of the one or more respective durations over which an energy saving mode of the one or more energy saving modes is to be used at the network entity; and communicating the data signal: over the duration, in accordance with the energy saving mode, and using a BWP of the one or more respective BWPs associated with the energy saving mode.

Aspect 15: The method of aspect 14, further comprising: outputting third control signaling scheduling a second data signal to be communicated between the UE and the network entity using a second BWP; and communicating, in response to outputting the third control signaling, the second data signal using the second BWP in accordance with a default operation mode of the network entity based at least in part on the second BWP being unidentified in the energy saving mode indication.

Aspect 16: The method of any of aspects 14 through 15, further comprising: outputting third control signaling comprising an indication that identifies at least one BWP associated with a default operation mode of the network entity.

Aspect 17: The method of aspect 16, wherein at least one BWP associated with the default operation mode of the network entity comprises an initial access BWP.

Aspect 18: The method of any of aspects 14 through 17, wherein the energy saving mode indication identifies a respective range of frequencies included in each of the one or more respective BWPs associated with each of the one or more energy saving modes.

Aspect 19: The method of any of aspects 14 through 18, wherein the duration overlaps with a second duration associated with a second energy saving mode, the second energy saving mode being of a same energy saving mode type as the energy saving mode associated with the duration.

Aspect 20: The method of any of aspects 14 through 19, wherein the BWP overlaps with a second BWP associated with a second energy saving mode, the second energy saving mode being of a same energy saving mode type as the energy saving mode associated with the BWP.

Aspect 21: The method of any of aspects 14 through 20, further comprising: outputting third control signaling comprising an indication for the UE to transition from using a second BWP to the BWP for communications with the network entity, wherein communicating the data signal in accordance with the energy saving mode is based at least in part on a time at which the UE is to transition from using the second BWP to the BWP.

Aspect 22: The method of aspect 21, wherein the energy saving mode is included in a sequence of energy saving modes associated with the BWP, and the time at which the UE is to transition from using the second BWP to the BWP corresponds to a beginning of the duration associated with the energy saving mode and a beginning of the sequence of energy saving modes.

Aspect 23: The method of aspect 21, wherein the energy saving mode is included in a sequence of energy saving modes associated with the BWP, a beginning of the sequence of energy saving modes overlaps in time with a beginning of a second sequence of energy saving modes associated with the second BWP, and communicating the data signal in accordance with the energy saving mode is based at least in part on a temporal position of the sequence of energy saving modes relative to the duration at the time at which the UE is to transition from using the second BWP to the BWP.

Aspect 24: The method of any of aspects 14 through 23, further comprising: outputting third control signaling comprising an indication of the energy saving mode, wherein communicating the data signal using the BWP in accordance with the energy saving mode is based at least in part on the third control signaling.

Aspect 25: The method of aspect 24, wherein the energy saving mode is associated with a plurality of BWPs including the BWP, and communicating the data signal using the BWP in accordance with the energy saving mode is based at least in part on the BWP being associated with a smallest BWP identifier of a plurality of BWP identifiers associated with the plurality of BWPs.

Aspect 26: The method of aspect 24, wherein the energy saving mode is associated with a plurality of BWPs including the BWP, and communicating the data signal using the BWP in accordance with the energy saving mode is based at least in part on a size of the BWP.

Aspect 27: An apparatus for wireless communication at a UE, comprising a processor; memory coupled with the processor and storing instructions executable by the processor to cause the apparatus to perform a method of any of aspects 1 through 13.

Aspect 28: An apparatus for wireless communication at a UE, comprising at least one means for performing a method of any of aspects 1 through 13.

Aspect 29: A non-transitory computer-readable medium storing code for wireless communication at a UE, the code comprising instructions executable by a processor to perform a method of any of aspects 1 through 13.

Aspect 30: An apparatus for wireless communication at a network entity, comprising a processor; memory coupled with the processor and storing instructions executable by the processor to cause the apparatus to perform a method of any of aspects 14 through 26.

Aspect 31: An apparatus for wireless communication at a network entity, comprising at least one means for performing a method of any of aspects 14 through 26.

Aspect 32: A non-transitory computer-readable medium storing code for wireless communication at a network entity, the code comprising instructions executable by a processor to perform a method of any of aspects 14 through 26.

It is noted that the methods described herein describe possible implementations, and that the operations may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communication systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by one or more of voltages, currents, electromagnetic waves, magnetic fields or particles, or optical fields or particles.

The various illustrative blocks and components described in connection with the disclosure herein may be implemented or performed using one or more of a general-purpose processor, a DSP, an ASIC, a CPU, an FPGA or other programmable logic device, discrete gate or transistor logic, or discrete hardware components designed to perform the functions described herein. A general-purpose processor may be a microprocessor but, in the alternative, the processor may be any processor, controller, microcontroller, or state machine. A processor may also be implemented as a combination of computing devices (for example, a combination of a DSP and a microprocessor, multiple microprocessors, one or more microprocessors in conjunction with a DSP core, or any other such configuration).

The functions described herein may be implemented using one or more of hardware, software executed by a processor, or firmware. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. In some examples, such as in examples in which the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (in other words, A and B and C). Also, as used herein, the phrase "based on" shall not be construed as a reference to a closed set of conditions. For example, an example operation that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (for example, receiving information), accessing (for example, accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
   receiving first control signaling comprising an energy saving mode indication that identifies: one or more energy saving modes of a network entity, one or more respective bandwidth parts associated with each of the one or more energy saving modes, and one or more respective durations over which each of the one or more energy saving modes is to be used at the network entity;
   receiving second control signaling scheduling a data signal to be communicated between the UE and the network entity over a duration of the one or more respective durations over which an energy saving mode of the one or more energy saving modes is to be used at the network entity; and
   communicating the data signal over the duration in accordance with the energy saving mode and using a bandwidth part of the one or more respective bandwidth parts associated with the energy saving mode.

2. The method of claim 1, further comprising:
   receiving third control signaling scheduling a second data signal to be communicated between the UE and the network entity using a second bandwidth part; and
   communicating, in response to receiving the third control signaling, the second data signal using the second bandwidth part in accordance with a default operation mode of the network entity based at least in part on the second bandwidth part being unidentified in the energy saving mode indication.

3. The method of claim 1, further comprising receiving third control signaling comprising an indication that identifies at least one bandwidth part associated with a default operation mode of the network entity.

4. The method of claim 3, wherein at least one bandwidth part associated with the default operation mode of the network entity comprises an initial access bandwidth part.

5. The method of claim 1, wherein the energy saving mode indication identifies a respective range of frequencies included in each of the one or more respective bandwidth parts associated with each of the one or more energy saving modes.

6. The method of claim 1, wherein the duration overlaps with a second duration associated with a second energy saving mode, the second energy saving mode being of a same energy saving mode type as the energy saving mode associated with the duration.

7. The method of claim 1, wherein the bandwidth part overlaps with a second bandwidth part associated with a second energy saving mode, the second energy saving mode being of a same energy saving mode type as the energy saving mode associated with the bandwidth part.

8. The method of claim 1, further comprising receiving third control signaling comprising an indication for the UE to transition from using a second bandwidth part to the bandwidth part for communication with the network entity, wherein communicating the data signal in accordance with the energy saving mode is based at least in part on a time at which the UE transitions from using the second bandwidth part to the bandwidth part.

9. The method of claim 8, wherein:
   the energy saving mode is included in a sequence of energy saving modes associated with the bandwidth part, and
   the time at which the UE transitions from using the second bandwidth part to the bandwidth part corresponds to a beginning of the duration associated with the energy saving mode and a beginning of the sequence of energy saving modes.

10. The method of claim 8, wherein:
    the energy saving mode is included in a sequence of energy saving modes associated with the bandwidth part,
    a beginning of the sequence of energy saving modes overlaps in time with a beginning of a second sequence of energy saving modes associated with the second bandwidth part, and
    communicating the data signal in accordance with the energy saving mode is based at least in part on a temporal position of the sequence of energy saving modes relative to the duration at the time at which the UE transitions from using the second bandwidth part to the bandwidth part.

11. The method of claim 1, further comprising receiving third control signaling comprising an indication of the energy saving mode, wherein communicating the data signal using the bandwidth part in accordance with the energy saving mode is based at least in part on the third control signaling.

12. The method of claim 11, wherein:
    the energy saving mode is associated with a plurality of bandwidth parts including the bandwidth part, and
    communicating the data signal using the bandwidth part in accordance with the energy saving mode is based at least in part on the bandwidth part being associated with a smallest bandwidth part identifier of a plurality of bandwidth part identifiers associated with the plurality of bandwidth parts.

13. The method of claim 11, wherein:
    the energy saving mode is associated with a plurality of bandwidth parts including the bandwidth part, and
    communicating the data signal using the bandwidth part in accordance with the energy saving mode is based at least in part on a size of the bandwidth part.

14. A method for wireless communication at a network entity, comprising:

outputting first control signaling comprising an energy saving mode indication that identifies: one or more energy saving modes of the network entity, one or more respective bandwidth parts associated with each of the one or more energy saving modes, and one or more respective durations over which each of the one or more energy saving modes is to be used at the network entity;

outputting second control signaling scheduling a data signal to be communicated between a user equipment (UE) and the network entity over a duration of the one or more respective durations over which an energy saving mode of the one or more energy saving modes is to be used at the network entity; and communicating the data signal: over the duration, in accordance with the energy saving mode, and using a bandwidth part of the one or more respective bandwidth parts associated with the energy saving mode.

15. The method of claim 14, further comprising:

outputting third control signaling scheduling a second data signal to be communicated between the UE and the network entity using a second bandwidth part; and communicating, in response to outputting the third control signaling, the second data signal using the second bandwidth part in accordance with a default operation mode of the network entity based at least in part on the second bandwidth part being unidentified in the energy saving mode indication.

16. The method of claim 14, further comprising outputting third control signaling comprising an indication that identifies at least one bandwidth part associated with a default operation mode of the network entity.

17. The method of claim 16, wherein at least one bandwidth part associated with the default operation mode of the network entity comprises an initial access bandwidth part.

18. The method of claim 14, wherein the energy saving mode indication identifies a respective range of frequencies included in each of the one or more respective bandwidth parts associated with each of the one or more energy saving modes.

19. The method of claim 14, wherein the duration overlaps with a second duration associated with a second energy saving mode, the second energy saving mode being of a same energy saving mode type as the energy saving mode associated with the duration.

20. The method of claim 14, wherein the bandwidth part overlaps with a second bandwidth part associated with a second energy saving mode, the second energy saving mode being of a same energy saving mode type as the energy saving mode associated with the bandwidth part.

21. The method of claim 14, further comprising outputting third control signaling comprising an indication for the UE to transition from using a second bandwidth part to the bandwidth part for communication with the network entity, wherein communicating the data signal in accordance with the energy saving mode is based at least in part on a time at which the UE is to transition from using the second bandwidth part to the bandwidth part.

22. The method of claim 21, wherein:

the energy saving mode is included in a sequence of energy saving modes associated with the bandwidth part, and the time at which the UE is to transition from using the second bandwidth part to the bandwidth part corresponds to a beginning of the duration associated with the energy saving mode and a beginning of the sequence of energy saving modes.

23. The method of claim 21, wherein:

the energy saving mode is included in a sequence of energy saving modes associated with the bandwidth part, a beginning of the sequence of energy saving modes overlaps in time with a beginning of a second sequence of energy saving modes associated with the second bandwidth part, and communicating the data signal in accordance with the energy saving mode is based at least in part on a temporal position of the sequence of energy saving modes relative to the duration at the time at which the UE is to transition from using the second bandwidth part to the bandwidth part.

24. The method of claim 14, further comprising outputting third control signaling comprising an indication of the energy saving mode, wherein communicating the data signal using the bandwidth part in accordance with the energy saving mode is based at least in part on the third control signaling.

25. The method of claim 24, wherein:

the energy saving mode is associated with a plurality of bandwidth parts including the bandwidth part, and communicating the data signal using the bandwidth part in accordance with the energy saving mode is based at least in part on the bandwidth part being associated with a smallest bandwidth part identifier of a plurality of bandwidth part identifiers associated with the plurality of bandwidth parts.

26. The method of claim 24, wherein:

the energy saving mode is associated with a plurality of bandwidth parts including the bandwidth part, and communicating the data signal using the bandwidth part in accordance with the energy saving mode is based at least in part on a size of the bandwidth part.

27. An apparatus for wireless communication at a user equipment (UE), comprising:

a processor; and memory coupled with the processor and storing instructions executable by the processor to cause the apparatus to:

receive first control signaling comprising an energy saving mode indication that identifies: one or more energy saving modes of a network entity, one or more respective bandwidth parts associated with each of the one or more energy saving modes, and one or more respective durations over which each of the one or more energy saving modes is to be used at the network entity;

receive second control signaling scheduling a data signal to be communicated between the UE and the network entity over a duration of the one or more respective durations over which an energy saving mode of the one or more energy saving modes is to be used at the network entity; and communicate the data signal over the duration in accordance with the energy saving mode and using a bandwidth part of the one or more respective bandwidth parts associated with the energy saving mode.

28. The apparatus of claim 27, wherein the instructions are further executable by the processor to cause the apparatus to:

receive third control signaling scheduling a second data signal to be communicated between the UE and the network entity using a second bandwidth part; and communicate, in response to receiving the third control signaling, the second data signal using the second bandwidth part in accordance with a default operation mode of the network entity based at least in part on the second bandwidth part being unidentified in the energy saving mode indication.

29. An apparatus for wireless communication at a network entity, comprising:
a processor; and
memory coupled with the processor and storing instructions executable by the processor to cause the apparatus to:
output first control signaling comprising an energy saving mode indication that identifies: one or more energy saving modes of the network entity, one or more respective bandwidth parts associated with each of the one or more energy saving modes, and one or more respective durations over which each of the one or more energy saving modes is to be used at the network entity;
output second control signaling scheduling a data signal to be communicated between a user equipment (UE) and the network entity over a duration of the one or more respective durations over which an energy saving mode of the one or more energy saving modes is to be used at the network entity; and
communicate the data signal: over the duration, in accordance with the energy saving mode, and using a bandwidth part of the one or more respective bandwidth parts associated with the energy saving mode.

30. The apparatus of claim 29, wherein the instructions are further executable by the processor to cause the apparatus to output third control signaling comprising an indication that identifies at least one bandwidth part associated with a default operation mode of the network entity.

* * * * *